(12) United States Patent
Glidden et al.

(10) Patent No.: US 12,465,615 B2
(45) Date of Patent: Nov. 11, 2025

(54) AQUEOUS SOLUTIONS CONTAINING PURINES AND PYRIMIDINES AND USES THEREOF

(71) Applicant: UCB BIOSCIENCES, INC., Morrisville, NC (US)

(72) Inventors: Paul Glidden, Emeryville, CA (US); Eric Scharin, Emeryville, CA (US)

(73) Assignee: UCB BIOSCIENCES, INC., Morrisville, NC (US)

( * ) Notice: Subject to any disclaimer, the term of this patent is extended or adjusted under 35 U.S.C. 154(b) by 101 days.

(21) Appl. No.: 17/705,060

(22) Filed: Mar. 25, 2022

(65) Prior Publication Data
US 2022/0305041 A1   Sep. 29, 2022

Related U.S. Application Data

(60) Provisional application No. 63/166,860, filed on Mar. 26, 2021.

(51) Int. Cl.
| | | |
|---|---|---|
| *A61K 31/708* | (2006.01) | |
| *A61K 31/7068* | (2006.01) | |
| *A61K 31/7072* | (2006.01) | |
| *A61K 31/7076* | (2006.01) | |

(52) U.S. Cl.
CPC ........ *A61K 31/708* (2013.01); *A61K 31/7068* (2013.01); *A61K 31/7072* (2013.01); *A61K 31/7076* (2013.01)

(58) Field of Classification Search
CPC .............. A61K 31/708; A61K 31/7068; A61K 31/7072; A61K 31/7076
See application file for complete search history.

(56) References Cited

U.S. PATENT DOCUMENTS

| | | | |
|---|---|---|---|
| 6,258,795 B1 | 7/2001 | Von Borstel et al. | |
| 10,471,087 B2 | 11/2019 | Hirano et al. | |
| 11,628,182 B2 * | 4/2023 | DiPietro | ............ A61K 31/7072 514/46 |
| 11,649,259 B2 * | 5/2023 | Glidden | ................. A61K 47/02 514/49 |
| 2011/0229871 A1 | 9/2011 | Ericson | |
| 2016/0279159 A1 | 9/2016 | Hirano et al. | |
| 2018/0161332 A1 | 6/2018 | Mart Seves et al. | |
| 2021/0054014 A1 | 2/2021 | Glidden | |
| 2021/0077519 A1 | 3/2021 | DiPietro | |
| 2023/0000890 A1 * | 1/2023 | DiPietro | .............. A61K 9/0053 |
| 2024/0016938 A1 * | 1/2024 | Mittur | .................... A61K 47/26 |

FOREIGN PATENT DOCUMENTS

| | | | | |
|---|---|---|---|---|
| CN | 202666004 U | * | 1/2013 | |
| WO | WO-2016205671 A1 | | 12/2016 | |
| WO | WO-2019200340 A1 | * | 10/2019 | ......... A61K 31/7072 |
| WO | WO-2019204593 A1 | | 10/2019 | |

OTHER PUBLICATIONS

Wilson, D. S.; Keefe, A. D.; Random Mutagenesis by PCR, 2000, Current Protocols in Molecular Biology, pp. 8.3.1-8.3.9. (Year: 2000).*
Pillwein, K.; et al. "Effect of Ischemia on Nucleosides and Bases in Rat Liver and Hepatoma 3924A" 1987, Cancer Research, vol. 47, pp. 3092-3096. (Year: 1987).*
Mathew, J.; et al. "Physiology, Blood Plasma" 2023, StatPearls Publishing—NCBI Bookshelf 2023, PMID: 30285399. (Year: 2023).*
Lopez-Gomez, C.; et al. "Bioavailability and cytosolic kinases modulate response to deoxynucleoside therapy in TK2 deficiency" 2019, EBioMedicine, vol. 46, pp. 356-367. (Year: 2019).*
Gorbunova, V.; et al. "Rodents for comparative aging studies: from mice to beavers" 2008, Age, vol. 30, pp. 111-119. (Year: 2008).*
Bulst, S.; et al. "In vitro supplementation with dAMP/dGMP leads to partial restoration of mtDNA levels in mitochondrial depletion syndromes" 2009, Human Molecular Genetics, vol. 18, pp. 1590-1599. (Year: 2009).*
English translation of CN202666004U (translated on Jan. 22, 2024). (Year: 2013).*
Definition of "solubility", Merriam Webster (accessed Sep. 19, 2024). (Year: 2024).*
International Search Report and Written Opinion for International Application No. PCT/US22/22015, International Searching Authority, United States, mailed on Aug. 2, 2022, 17 pages.
PubChem, "Thymidine," CID 5789, pp. 1-7, accessed at https://pubchem.ncbi.nlm.nih.gov/compound/Thymidine, Sep. 16, 2004, 51 pages.
Behin, A., et al., "Adult Cases of Mitochondrial DNA Depletion Due to TK2 Defect: An Expanding Spectrum," *Neurology* 78(9):644-648, Lippincott Williams & Wilkins, United States (Feb. 2012).
Bourdon, A., et al., "Mutation of RRM2B, Encoding P53-Controlled Ribonucleotide Reductase (P53R2), Causes Severe Mitochondrial DNA Depletion," *Nature Genetics* 39(6):776-780, Nature Pub. Co., United States (Jun. 2007).
Copeland, W.C., "Inherited Mitochondrial Diseases of DNA Replication," *Annual Review of Medicine* 59:131-146, Annual Reviews, United States (2008).

(Continued)

*Primary Examiner* — Eric Olson
*Assistant Examiner* — Benjamin M Brandsen
(74) *Attorney, Agent, or Firm* — Sterne, Kessler Goldstein & Fox P.L.L.C.

(57) ABSTRACT

Provided are compositions comprising a first heteroaryl compound and a second heteroaryl compound dissolved in an aqueous liquid. Also provided are methods of treating a patient that include orally administering such an aqueous liquid to a patient, for example, wherein the patient has been diagnosed with a mitochondrial depletion syndrome. Kits are provided that include the first heteroaryl compound, the second heteroaryl compound, and optionally instructions for dissolving the first heteroaryl compound and the second heteroaryl compound in an aqueous liquid and administering the solution to a patient.

34 Claims, 3 Drawing Sheets

(56) References Cited

OTHER PUBLICATIONS

Elpeleg, O., et al., "Deficiency of the ADP-Forming Succinyl-CoA Synthase Activity is Associated With Encephalomyopathy and Mitochondrial DNA Depletion," *American Journal of Human Genetics* 76(6):1081-1086, Cell Press, United States (Jun. 2005).
Garone, C., et al., "MPV17 Mutations Causing Adult-Onset Multisystemic Disorder With Multiple Mitochondrial DNA Deletions," *Archives of Neurology* 69(12):1648-1651, American Medical Association, United States (Dec. 2012).
Goethem, G.V., et al., "Mutation of POLG is Associated With Progressive External Ophthalmoplegia Characterized by mtDNA Deletions," *Nature Genetics* 28(3):211-212, Nature Pub. Co., United States (Jul. 2001).
Hirano, M., et al., "Defects of Intergenomic Communication: Autosomal Disorders That Cause Multiple Deletions and Depletion of Mitochondrial DNA," *Seminars in Cell & Developmental Biology* 12(6):417-427, Academic Press, England (Dec. 2001).
Kondo, D.G., et al., "Open-Label Uridine for Treatment of Depressed Adolescents With Bipolar Disorder," *Journal of Child and Adolescent Psychopharmacology* 21(2):171-175, Mary Ann Liebert, United States (Apr. 2011).
Longley, M.J., et al., "Mutant POLG2 Disrupts DNA Polymerase Gamma Subunits and Causes Progressive External Ophthalmoplegia," *American Journal of Human Genetics* 78(6):1026-1034, Cell Press, United States (Jun. 2006).
Mandel, H., et al., "The Deoxyguanosine Kinase Gene is Mutated in Individuals With Depleted Hepatocerebral Mitochondrial DNA," *Nature Genetics* 29(3):337-341, Nature Pub. Co., United States (Nov. 2001).
Naviaux, R.K. and Nguyen, K.V., "POLG Mutations Associated With Alpers' Syndrome and Mitochondrial DNA Depletion," *Annals of Neurology* 55(5):706-712, Wiley-Liss, United States (May 2004).
Nishino, I., et al., "Thymidine Phosphorylase Gene Mutations in MNGIE, A Human Mitochondrial Disorder," *Science* 283(5402):689-692, American Association for the Advancement of Science, United States (Jan. 1999).
Ostergaard, E., et al., "Mitochondrial Encephalomyopathy With Elevated Methylmalonic Acid is Caused by SUCLA2 Mutations," *Brain : A Journal of Neurology* 130(Pt 3):853-861, Oxford University Press, England (Mar. 2007).
Paradas, C., et al., "TK2 Mutation Presenting as Indolent Myopathy," *Neurology* 80(5):504-506, Lippincott Williams & Wilkins, United States (Jan. 2013).
Ronchi, D., et al., "Next-Generation Sequencing Reveals DGUOK Mutations in Adult Patients With Mitochondrial DNA Multiple Deletions," *Brain : A Journal of Neurology* 135(Pt 11):3404-3415, Oxford University Press, England (Nov. 2012).
Saada, A., et al, "Mutant Mitochondrial Thymidine Kinase in Mitochondrial DNA Depletion Myopathy," *Nature Genetics* 29(3):342-344, Nature Pub. Co., United States (Nov. 2001).
Saada, A., et al., "Mitochondrial Deoxyribonucleoside Triphosphate Pools in Thymidine Kinase 2 Deficiency," *Biochemical and Biophysical Research Communications* 310(3):963-966, Elsevier, United States (Oct. 2003).
Sarzi, E., et al., "Twinkle Helicase (PEO1) Gene Mutation Causes Mitochondrial DNA Depletion," *Annals of Neurology* 62(6):579-587, Wiley-Liss, United States (Dec. 2007).
Spelbrink, J.N., et al., "Human Mitochondrial DNA Deletions Associated With Mutations in the Gene Encoding Twinkle, a Phage T7 Gene 4-Like Protein Localized in Mitochondria," *Nature Genetics* 28(3):223-231, Nature Pub. Co., United States (Jul. 2001).
Spinazzola, A., et al., "MPV17 Encodes an Inner Mitochondrial Membrane Protein and is Mutated in Infantile Hepatic Mitochondrial DNA Depletion," *Nature Genetics* 38(5):570-575, Nature Pub. Co., United States (May 2006).
Tyynismaa, H., et al., "A Heterozygous Truncating Mutation in RRM2B Causes Autosomal-dominant Progressive External Ophthalmoplegia With Multiple mtDNA Deletions," *American Journal of Human Genetics* 85(2):290-295, Cell Press, United States (Aug. 2009).
Tyynismaa, H., et al., "Thymidine Kinase 2 Mutations in Autosomal Recessive Progressive External Ophthalmoplegia With Multiple Mitochondrial DNA Deletions," *Human Molecular Genetics* 21(1):66-75, IRL Press at Oxford University Press, England (Jan. 2012).

* cited by examiner

AQUEOUS SOLUTIONS CONTAINING PURINES AND PYRIMIDINES AND USES THEREOF

CROSS-REFERENCE TO RELATED APPLICATIONS

This application claims priority to U.S. Provisional Patent Application No. 63/166,860, filed on Mar. 26, 2021, which is incorporated by reference herein in its entirety.

INTRODUCTION

Mitochondrial DNA depletion syndrome (MDS or MDDS) is a type of mitochondrial disease that can cause severe childhood encephalomyopathy, which includes encephalopathy (disorder of the brain) and myopathy (disease of the muscles). Mitochondrial DNA depletion syndrome is characterized molecularly by a reduction in mitochondrial DNA (mtDNA) copy number in tissues and insufficient synthesis of mitochondrial respiratory chain (RC) complexes (Hirano et al, 2001). Mutation in several nuclear genes have been identified as causes of infantile MDS, including TK2, DGUOK, POLG, POLG2, SCLA25A4, MPV17, RRM2B, SUCLA2, SUCLG1, TYMP, OPA1, and ClOorfl (PEO1). (Bourdon, et al., Nat Genet 39, 776-780 (2007); Copeland, Ann. Rev. Med. 59: 131-146 (2008); Elpeleg, et al., Am J Hum Genet. 76:1081-6 (2005); Mandel, et al., Nat. Genet. 29:337-341 (2001); Naviaux and Nguyen, Ann. Neurology 55(5): 706-712 (2004); Ostergaard, et al., Brain. 130:853-61 (2007); Saada, et al., Biochem Biophys. Res. Commun. 310: 963-966 (2003); Sarzi, et al., Off. J. Am. Neur. Assoc. and the Child Neur. Soc. 62.6: 579-587 (2007); Spinazzola, et al, Nat. Genet. 38, 570-575 (2006)). In addition, mutations in these nuclear genes can also cause multiple deletions of mtDNA with or without mtDNA depletion (Behin, et al., Neurology 78:644-648 (2012); Garone, et al., Arch. Neurol. 69, 1648-1651 (2012); Longley, et al., Am. J. Hum. Genet 78:1026-1034 (2006); Nishino, et al., Science 283:689-692 (1999); Paradas, et al., Neurology 80(5): 504-506 (2013); Ronchi, et al., Brain 135: 3404-3415 (2012); Spelbrink, et al., Nat. Genetics 28: 223-231 (2001); Tyynismaa, et al., Am. J. Hum. Genet. 85: 290-295 (2009); Tyynismaa, et al., Hum. Mol. Genet. 21:66-75 (2012); Van Goethem, et al., Nat. Genet. 28:211-212 (2001)).

One of the genes implicated in MDS is TK2, which encodes for thymidine kinase (TK2), a mitochondrial enzyme required for the phosphorylation of the pyrimidine nucleosides (thymidine and deoxycytidine) to generate deoxythymidine monophosphate (dTMP) and deoxycytidine monophosphate (dCMP) (Saada, et al. 2001). Mutations in TK2 impair the mitochondrial nucleoside/nucleotide salvage pathways required for synthesis of deoxynucleotide triphosphate (dNTP), the building blocks for mDNA replication and repair.

An improvement in symptoms has been observed after administration of thymidine and deoxycytidine to patients diagnosed with TK2 deficiency (U.S. Pat. No. 10,471,087). However, relatively large doses of the thymidine and deoxycytidine were administered, e.g. each nucleoside is initially dosed at 130 mg/kg/day, divided into 3 equal daily doses of approximately 43 mg/kg/dose. If the tolerability profile is acceptable after 2 weeks, the dose can be increased to 260 mg/kg/day of each nucleoside, and then to 400 mg/kg/day. As such, a 100 kg patient who reaches the upper limit of the daily dose can be administered up to 80 g active (40 g of deoxycytidine and 40 g of thymidine) per day.

Given the relatively low solubility of some nucleosides such as thymidine in water, large volumes of solutions containing the nucleosides are needed to administer the nucleosides as an oral solution. However, swallowing can be difficult for some MDS patients due to the myopathy (muscular problems) associated with the disease. As such, swallowing the large volumes of liquid necessary to dissolve the nucleosides can present a difficulty for some MDS patients. Consuming the nucleosides in a solid form, e.g. in pill form, can also be problematic for MDS patients due to their swallowing difficulties. In fact, in some cases the patients are administered most or all foods and liquids through a tube due to the difficulty of swallowing, e.g. through a gastrostomy tube or a nasogastric tube.

Given these considerations, the International Council for Harmonisation of Technical Requirements for Pharmaceuticals for Human Use (ICH) has developed guidelines regarding the formulation of drugs. The ICH guidelines for pediatric use promote considerations such as the ease of accurate dose measurement and the capability to deliver small volumes of liquids to minimize the risk of dosing errors, especially in neonates, infants, and young children. Such approaches could include clearly marked administration devices, and/or devices with scaling capability designed for accurate measurement of the smallest dose volume and dose increments. [See, for example, FDA Guidance "E11 (R1) Addendum: Clinical Investigation of Medicinal Products in the Pediatric Population" April 2018 and EMA "Guideline on pharmaceutical development of medicines for paediatric use" August 2013 EMA/CHMP/QWP/805880/2012 Rev. 2]

SUMMARY

In some embodiments, provided are compositions comprising one or more heteroaryl compounds dissolved in an aqueous liquid. In some embodiments, the heteroaryl compounds are selected from purines, pyrimidines, and combinations thereof.

In some embodiments, provided are compositions comprising purines, pyrimidines, and combinations thereof, dissolved in an aqueous liquid. In some embodiments, provided are compositions comprising combinations of purines and pyrimidines that exhibit 1) increased aqueous solubility as compared to the particular purine or pyrimidine alone, and 2) decreased dissolution time as compared to the particular purine or pyrimidine alone. The improved solubility allows for faster reconstitution and using smaller volumes of liquid when making therapeutic formulations to minimize the risk of dosing errors. In some embodiments, the increased aqueous solubility and decreased dissolution time are exhibited by combinations of purines with purines, combinations of pyrimidines with pyrimidines, and combinations of purines with pyrimidines.

In some embodiments, the compositions comprise two purines in a molar ratio of about 10:1 to about 1:10. In some embodiments, the compositions comprise two pyrimidines in a molar ratio of about 10:1 to about 1:10. In some embodiments, the compositions comprise a purine and a pyrimidine in a molar ratio of about 10:1 to about 1:10, respectively. In some embodiments, the compositions comprise a pyrimidine and a purine in a molar ratio of about 10:1 to about 1:10, respectively.

In some embodiments, provided are compositions comprising purines, pyrimidines, and combinations thereof, dissolved in an aqueous liquid. In some embodiments, the purines and pyrimidines can be selected from one or more of the purines and pyrimidines disclosed in U.S. application Ser. No. 17/046,865, which is incorporated-by-reference herein in its entirety.

In some embodiments, the purines and pyrimidines can be selected from one or more purine bases or pyrimidine bases. In some embodiments, the purine bases or pyrimidine bases can be selected from cytosine, thymine, guanine, adenine, uracil, xanthine, and combinations thereof. In some embodiments, the purine bases or pyrimidine bases can be selected from derivatives of cytosine, derivatives of thymine, derivatives of guanine, derivatives of adenine, derivatives of uracil, derivatives of xanthine, and combinations thereof.

In some embodiments, provided are compositions comprising two or more purines, two or more pyrimidines, or a mixture of two or more purines and pyrimidines. In some embodiments the compositions comprise two purines. In some embodiments the compositions comprise two pyrimidines. In some embodiments the compositions comprise one purine and one pyrimidine. In some embodiments, the purines are purine bases selected from adenine and guanine. In some embodiments, the pyrimidines are pyrimidine bases selected from cytosine and thymine.

In some embodiments, the purines are nucleosides or nucleoside derivatives. In some embodiments, the purines are nucleosides selected from guanosine and adenosine. In some embodiments, the purines are deoxynucleosides selected from deoxyguanosine and deoxyadenosine.

In some embodiments, the pyrimidines are nucleosides or nucleoside derivatives. In some embodiments, the pyrimidines are nucleosides selected from cytidine, thymidine, and uridine. In some embodiments, the pyrimidines are deoxynucleosides selected from deoxycytidine, deoxyuridine, and thymidine.

In some embodiments, provided are compositions comprising thymidine and deoxycytidine dissolved in an aqueous liquid. In some embodiments, provided are compositions comprising derivatives of deoxyguanosine and derivatives of deoxyadenosine dissolved in an aqueous liquid.

In some embodiments, the compositions comprise deoxyguanosine. In some embodiments, the compositions comprise deoxyadenosine. In some embodiments, the compositions comprise deoxyguanosine and deoxyadenosine.

In some embodiments, the compositions comprise a derivative of deoxyguanosine. In some embodiments, the compositions comprise a derivative of deoxyadenosine. In some embodiments, the compositions comprise a derivative of deoxyguanosine and a derivative of deoxyadenosine.

In some embodiments, the compositions comprise Compound C:

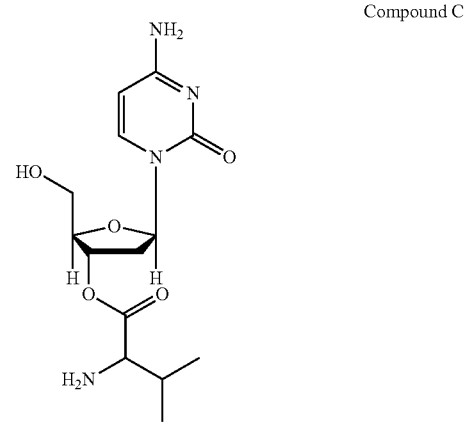

Compound C

In some embodiments, the compositions comprise Compound T:

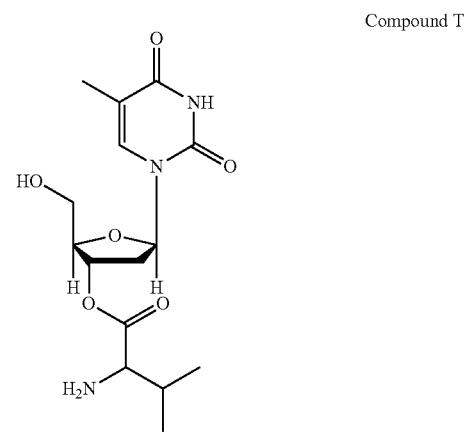

Compound T

In some embodiments, the compositions comprise Compound G:

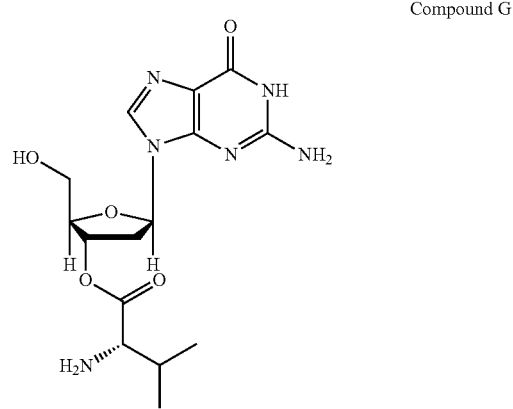

Compound G

In some embodiments, the compositions comprise Compound A:

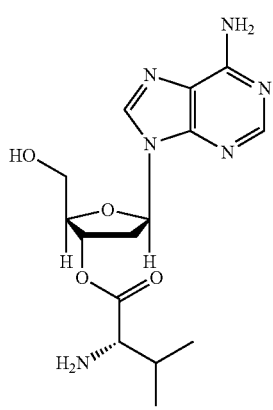

Compound A

In some embodiments, the compositions comprise Compound G and Compound A. In some embodiments, the compositions comprise Compound G and Compound A in a molar ratio of from about 1:0.1 to about 1:1. In some embodiments, the compositions comprise Compound G and Compound A in a molar ratio of from about 1:0.5 to about 1:1.

In some embodiments, the compositions comprise thymidine and deoxycytidine in a mass ratio of from about 1:0.1 to about 1:1. In some embodiments, the compositions comprise thymidine and deoxycytidine in a mass ratio of from about 1:0.4 to about 1:1.

In some embodiments, the compositions comprise Compound C and Compound T. In some embodiments, the compositions comprise Compound C and Compound T in a molar ratio of from about 1:0.1 to about 1:1. In some embodiments, the compositions comprise Compound C and Compound T in a molar ratio of from about 1:0.5 to about 1:1.

In some embodiments, the compositions comprise Compound G, Compound A, Compound C, and Compound T. In some embodiments, the compositions comprise Compound G, Compound A, Compound C, and Compound T in equimolar ratio.

In some embodiments, the compositions comprise Compound G, Compound A, deoxycytidine (dC), and thymidine (dT). In some embodiments, the compositions comprise Compound G, Compound A, deoxycytidine (dC), and thymidine (dT) in equimolar ratio.

In some embodiments, provided is a composition comprising a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound, and wherein the first heteroaryl compound and the second heteroaryl compound are selected from optionally substituted pyrimidines and optionally substituted purines.

In some embodiments, provided is a composition comprising a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound, along with a third heteroaryl compound and fourth heteroaryl compound, wherein the concentration of the third heteroaryl compound is higher relative to a composition comprising the third heteroaryl compound dissolved in an aqueous liquid without the fourth heteroaryl compound. In some embodiments the composition comprises a mixture of thymidine or a thymidine prodrug, deoxycytidine or a deoxycytidine prodrug, deoxyguanosine or a deoxyguanosine prodrug, and deoxyadenosine or a deoxyadenosine prodrug. In some embodiments, the composition comprising a mixture of thymidine or a thymidine prodrug, deoxycytidine or a deoxycytidine prodrug, deoxyguanosine or a deoxyguanosine prodrug, and deoxyadenosine or a deoxyadenosine prodrug provides enhanced solubility of both the substituted pyrimidine pair and substituted purine pair.

In some embodiments, the optionally substituted pyrimidines and optionally substituted purines are chosen from deoxynucleosides, deoxynucleotides having from 1 to 3 phosphate groups, nucleosides, nucleotides having from 1 to 3 phosphate groups, and prodrugs of any of the foregoing.

In some embodiments, the optionally substituted pyrimidines have Formula Ia

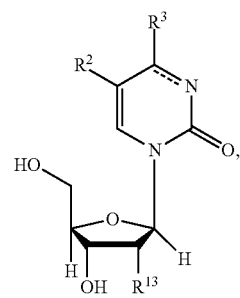

Formula Ia wherein $R^2$ is selected from hydrogen or $C_1$-$C_4$ alkyl;

$R^3$ is selected from hydrogen, amino, hydroxy, —$OR^5$, —$NHR^6$, or carbonyl;

$R^5$ is selected from hydrogen, halogen, optionally substituted alkyl, or optionally substituted aralkyl;

$R^6$ is selected from hydrogen, optionally substituted alkyl, optionally substituted aralkyl, —C(O)N($R^7$)($R^{7'}$), —C(O)O$R^8$, or —$R^9$;

$R^7$, $R^{7'}$, $R^8$, and $R^{10}$ are each independently selected from hydrogen, optionally substituted $C_1$-$C_{10}$ alkyl, optionally substituted $C_2$-$C_{10}$ alkenyl, optionally substituted $C_3$-$C_{10}$ cycloalkyl, optionally substituted 3-10 membered heterocyclyl, optionally substituted aryl, or optionally substituted heteroaryl;

$R^9$ is

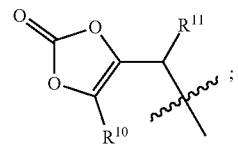

$R^{11}$ is selected from hydrogen, optionally substituted $C_1$-$C_{10}$ alkyl, and optionally substituted $C_2$-$C_{10}$ alkenyl;

$R^{13}$ is hydrogen or hydroxy; and

⁝⁝⁝ represents a single or double bond.

In some embodiments, the optionally substituted purines have Formula IIa

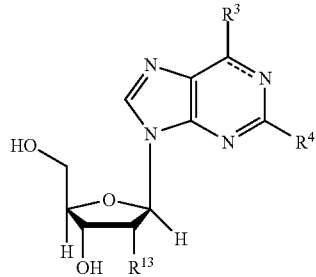

Formula IIa wherein $R^3$ is selected from hydrogen, amino, hydroxy, —$OR^5$, —$NHR^6$, or carbonyl,
$R^4$ is selected from hydrogen, amino, or —$NHR^6$,
$R^5$ is selected from hydrogen, halogen, optionally substituted alkyl, or optionally substituted aralkyl;
$R^6$ is selected from hydrogen, optionally substituted alkyl, optionally substituted aralkyl, —$C(O)N(R^7)(R^{7'})$, —$C(O)OR^8$, or —$R^9$;
$R^7$, $R^{7'}$, $R^8$, and $R^{10}$ are each independently selected from hydrogen, optionally substituted $C_1$-$C_{10}$ alkyl, optionally substituted $C_2$-$C_{10}$ alkenyl, optionally substituted $C_3$-$C_{10}$ cycloalkyl, optionally substituted 3-10 membered heterocyclyl, optionally substituted aryl, or optionally substituted heteroaryl;
$R^9$ is

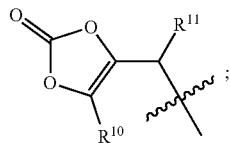

$R^{11}$ is selected from hydrogen, optionally substituted $C_1$-$C_{10}$ alkyl, and optionally substituted $C_2$-$C_{10}$ alkenyl;
$R^{13}$ is hydrogen or hydroxy; and
⸗ represents a single or double bond.

In some embodiments, the first heteroaryl compound is thymidine and the second heteroaryl compound is deoxycytidine. In some embodiments, the thymidine is at a concentration of about 20 mg/mL or more. In some embodiments, the thymidine is at a concentration ranging from about 40 mg/mL to about 60 mg/mL. In some embodiments, the thymidine is at a concentration ranging from about 50 mg/mL to about 90 mg/mL. In some embodiments, the mass of thymidine ranges from 0.5 g to 6.0 g per dose unit.

In some embodiments, the deoxycytidine is at a concentration of about 20 mg/mL or more. In some embodiments, the deoxycytidine is at a concentration ranging from about 40 mg/mL to about 60 mg/mL. In some embodiments, the deoxycytidine is at a concentration ranging from about 50 mg/mL to about 90 mg/mL. In some embodiments, the mass of deoxycytidine ranges from 0.5 g to 6.0 g per dose unit. In some embodiments, the mass of deoxycytidine ranges from about 40% to about 100% of the mass of thymidine. In some embodiments, the mass of deoxycytidine ranges from about 90% to about 110% of the mass of thymidine.

In some embodiments, the combined mass of thymidine and deoxycytidine ranges from 1.0 g to 12.0 g per dose unit.

In some embodiments, the first heteroaryl compound is Compound G

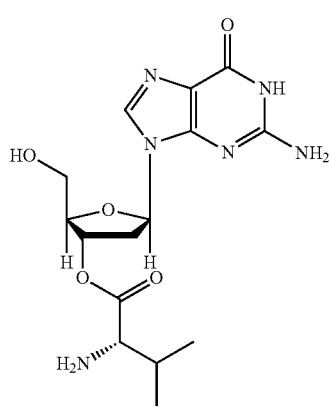

Compound G and the second heteroaryl compound is Compound A

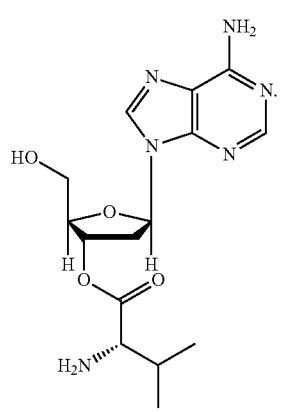

Compound A

In some embodiments, Compound G is at a concentration of about 20 mg/ml or more. In some embodiments, Compound G is at a concentration ranging from about 40 mg/mL to about 100 mg/mL. In some embodiments, Compound G is at a concentration ranging from about 60 mg/mL to about 100 mg/mL. In some embodiments, Compound A is at a concentration ranging from about 5 mg/mL to about 100 mg/mL. In some embodiments, the molar ratio of Compound G to Compound A is from about 1:0.1 to about 1:1. In some embodiments, the molar ratio of Compound G to Compound A is from about 1:0.5 to about 1:1. In some embodiments, the mass of Compound G ranges from 0.5 g to 6.0 g per dose unit. In some embodiments, the mass of Compound A ranges from 0.5 g to 6.0 g per dose unit. In some embodiments, the combined mass of Compound G and Compound A ranges from 1.0 g to 12.0 g per dose unit. In some embodiments, the mass of Compound A ranges from about 40% to about 100% of the mass of Compound G. In some embodiments, the mass of Compound A ranges from about 90% to about 110% of the mass of Compound G.

In some embodiments, the first heteroaryl compound and the second heteroaryl compound are selected from derivatives of nucleosides and derivatives of deoxynucleosides. In some embodiments, the first heteroaryl compound and the second heteroaryl compound are selected from prodrugs of nucleosides and prodrugs of deoxynucleosides.

In some embodiments, the first heteroaryl compound is a derivative of deoxyguanosine and the second heteroaryl compound is a derivative of deoxyadenosine. In some embodiments, the first heteroaryl compound is a prodrug of deoxyguanosine and the second heteroaryl compound is a prodrug of deoxyadenosine.

In some embodiments, the first heteroaryl compound and the second heteroaryl compound are selected from Group I:

Group I

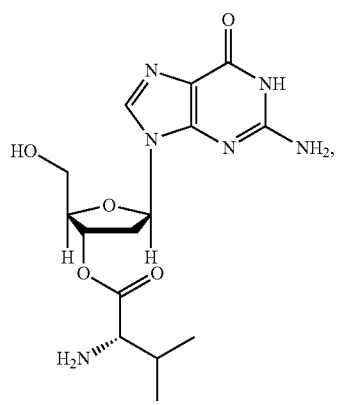

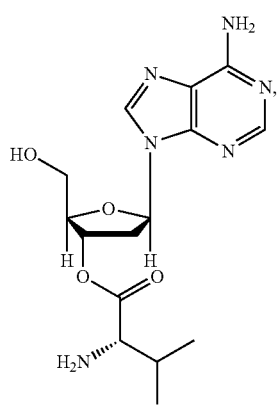

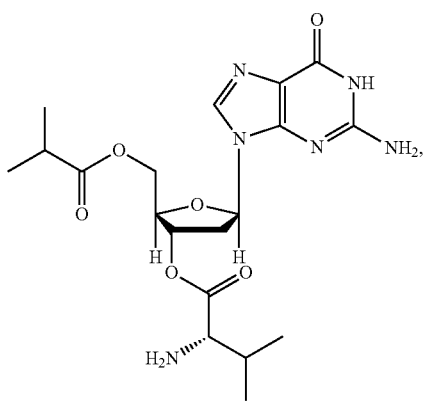

-continued

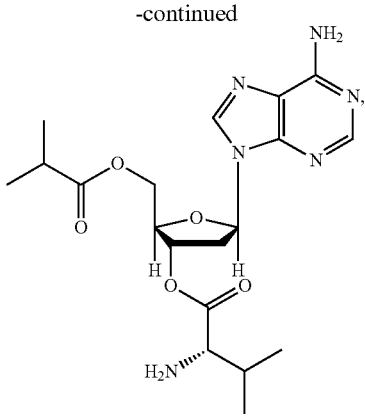

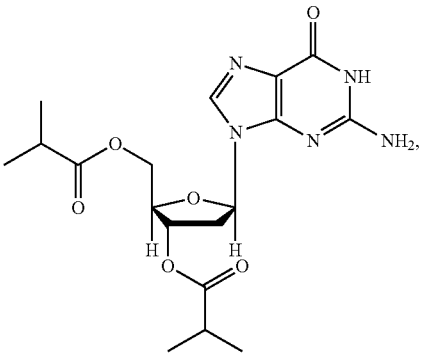

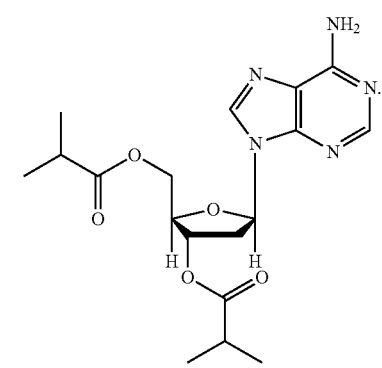

In some embodiments, the first heteroaryl compound and the second heteroaryl compound are selected from Group II:

Group II

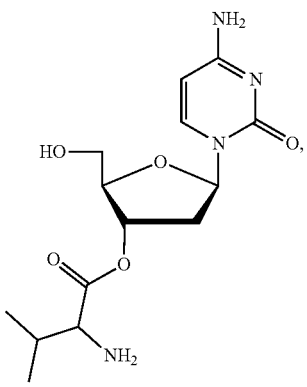

-continued

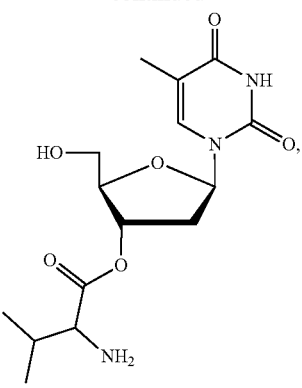

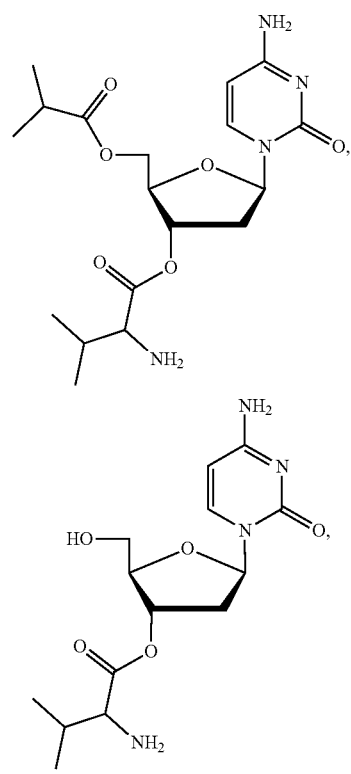

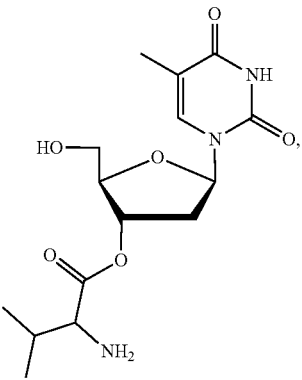

-continued

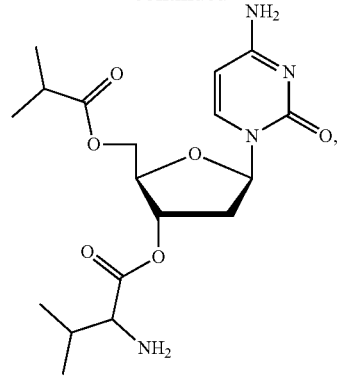

In some embodiments, provided is a composition comprising a first heteroaryl compound, a second heteroaryl compound, a third heteroaryl compound, and a fourth heteroaryl compound. In some embodiments, the first heteroaryl compound and the second heteroaryl compound are selected from Group I, and the third heteroaryl compound and the fourth heteroaryl compound are selected from Group II.

In some embodiments, the first heteroaryl compound is Compound G

Compound G

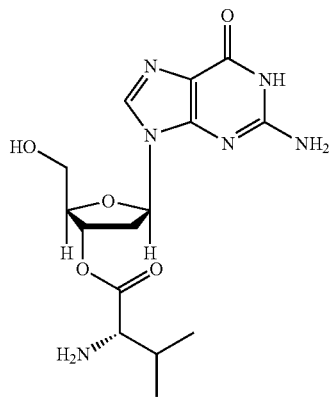

and the second heteroaryl compound is Compound A

Compound A

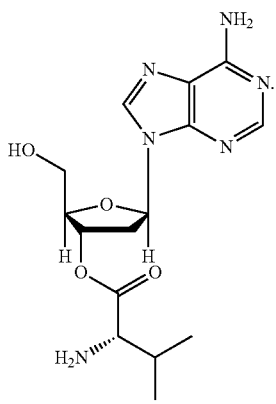

In some embodiments, Compound G is present at a concentration ranging from about 40 mg/mL to about 100 mg/mL. In some embodiments, Compound G is present at a concentration ranging from about 60 mg/mL to about 100 mg/mL. In some embodiments, Compound A is present at a concentration ranging from about 5 mg/mL to about 100 mg/mL. In some embodiments, the mass of Compound G ranges from about 0.5 g to about 6.0 g per dose unit. In some embodiments, the mass of Compound A ranges from 0.5 g to 6.0 g per dose unit. In some embodiments, the combined mass of Compound G and Compound A ranges from 1.0 g to 12.0 g per dose unit. In some embodiments, the molar ratio of Compound G to Compound A is from about 1:0.1 to about 1:1. In some embodiments, the molar ratio of Compound G to Compound A is from about 1:0.5 to about 1:1.

In some embodiments, provided is a composition as disclosed herein for use in treatment of a patient with a mutation in the TK2 gene resulting in mitochondrial depletion. In some embodiments, the composition comprises a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound, and wherein the first heteroaryl compound and the second heteroaryl compound are selected from optionally substituted pyrimidines and optionally substituted purines.

In some embodiments, provided is a method of treating a patient with a mutation in the TK2 gene resulting in mitochondrial depletion comprising administering a composition as disclosed herein. In some embodiments, provided is a method of treating a patient with a mutation in the TK2 gene resulting in mitochondrial depletion comprising administering a composition comprising a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound, and wherein the first heteroaryl compound and the second heteroaryl compound are selected from optionally substituted pyrimidines and optionally substituted purines.

In some embodiments, provided is a method comprising dissolving a first heteroaryl compound and a second heteroaryl compound in an aqueous liquid to form a solution, wherein the concentration of the first heteroaryl compound is higher relative to a composition comprising the first heteroaryl compound dissolved in an aqueous liquid without the second heteroaryl compound, and wherein the first heteroaryl compound and the second heteroaryl compound are selected from optionally substituted pyrimidines and optionally substituted purines.

In some embodiments, the dissolving is performed for about 5 minutes or less and at least 95% of the first heteroaryl compound and at least 95% of the second heteroaryl compound are dissolved. In some embodiments, the dissolving is performed for about 2 minutes or less and at least about 95% of the first heteroaryl compound and at least about 95% of the second heteroaryl compound are dissolved.

In some embodiments, the first heteroaryl compound is thymidine and the second heteroaryl compound is deoxycytidine. In some embodiments, the thymidine is present at a concentration ranging from about 40 mg/mL to about 60 mg/mL. In some embodiments, the thymidine is present at a concentration ranging from about 50 mg/mL to about 90 mg/mL. In some embodiments, the mass of thymidine ranges from about 0.5 g to about 6.0 g per dose unit. In some embodiments, the deoxycytidine is present at a concentration ranging from about 40 mg/mL to about 60 mg/mL. In some embodiments, the deoxycytidine is at a concentration ranging from about 50 mg/mL to about 90 mg/mL. In some embodiments, the mass of deoxycytidine ranges from 0.5 g to 6.0 g per dose unit. In some embodiments, the combined mass of thymidine and deoxycytidine ranges from 1.0 g to 12.0 g per dose unit.

In some embodiments, the aqueous liquid is located inside a container comprising a mark corresponding to a specific volume. In some embodiments, the mark indicates how many packages of the first heteroaryl compound and the second heteroaryl compound to use in the dissolving step.

In some embodiments, the method further comprises orally administering the solution to a subject. In some embodiments, the solution is orally administered using a syringe. In some embodiments, the syringe is configured to contain between 1 mL and 150 mL of a liquid. In some embodiments, the solution is orally administered through a nasogastric tube or a gastrostomy tube.

In some embodiments, the subject has been diagnosed with a mitochondrial DNA depletion syndrome, caused a mutation in a gene involved in maintenance of balanced mitochondrial nucleotide pools, such as, for example, the TK2 gene, or in mitochondrial DNA replication proteins, such as, for example, POLG1. Other gene mutations in genes involved in maintenance of nucleotide pools or mitochondrial DNA replication include: dGUOK, POLG2, SCLA25A4, MPV17, RRM12B, SUCLA2, SUCLG1, TYMP, OPA1, and C10orf2 (PEO1) and are disclosed in U.S. Pat. No. 10,471,087 and U.S. Published Application No. 20180161332. The skilled person will recognize the required combinations of nucleosides or pro-drugs effective in treating conditions caused by the gene mutations, based on the function of the protein expressed from a gene.

In some embodiments, the subject has been diagnosed with a deficiency in thymidine, a deficiency in deoxycytidine, a deficiency in deoxyguanosine, a deficiency in deoxyadenosine, or a combination thereof.

In some embodiments, the subject has been diagnosed with a pervasive developmental disorder associated with elevated purine levels, such as autism, or an autism spectrum disorder that is treatable with, e.g. uridine. In some embodiments, the subject has been diagnosed with suicidal ideation in depression or bipolar depression that is treatable with, e.g. uridine. (Kondo, et al., J Child Adolesc Psychopharmacol. 21(2):171-5 (2011)).

Uridine and cytidine acyl derivatives, for example, uridine triacetate, can be used to treat or prevent a variety of physiological and pathological conditions, including treatment of liver disease or damage, cerebrovascular disorders, respiratory distress syndromes, and cardiac damage as disclosed in U.S. Pat. No. 6,258,795.

In some embodiments, provided is a kit comprising a first heteroaryl compound; and a second heteroaryl compound, wherein the first heteroaryl compound and the second heteroaryl compound are selected from optionally substituted pyrimidines and optionally substituted purines.

In some embodiments, the kit further comprises printed instructions directing a user to dissolve the first heteroaryl compound and the second heteroaryl compound in a specific volume of an aqueous liquid. In some embodiments, the printed instructions further direct the user to dissolve the first heteroaryl compound and the second heteroaryl compound in a specific volume of an aqueous liquid by inverting and then righting the closed container one or more times.

In some embodiments, the kit further comprises a container with a lid and comprising a mark corresponding to the specific volume of aqueous liquid. In some embodiments, the mark indicates how many packages of the first heteroaryl compound and the second heteroaryl compound to use in the dissolving step. In some embodiments, at least one package contains both the first heteroaryl compound and the second heteroaryl compound. In some embodiments, at least one package contains the second heteroaryl compound but not the first heteroaryl compound. In some embodiments, each package contains from 0.5 g to 4.0 g of the first heteroaryl compound or the second heteroaryl compound. In some embodiments, the container further comprises a second mark corresponding to a second specific volume of aqueous liquid.

In some embodiments, the kit further comprises instructions directing a user to orally administer the solution to a subject. In some embodiments, the subject has been diagnosed with a mitochondrial DNA depletion syndrome, a deficiency in thymidine, a deficiency in deoxycytidine, a deficiency in deoxyguanosine, a deficiency in deoxyadenosine, a mutation in the TK2 gene, or a combination thereof. In some embodiments, the instructions state that the first heteroaryl compound and the second heteroaryl compound are to be administered in doses that each independently range from 100 mg/kg/day to 500 mg/kg/day. In some embodiments, the instructions state that the first heteroaryl compound and the second heteroaryl compound are to be administered in doses that each independently range from about 1 g/day to about 50 g/day, or from about 1 g/day to about 40 g/day, or from about 1 g/day to about 30 g/day, or from about 1 g/day to about 20 g/day, or from about 1 g/day to about 10 g/day, or from about 1 g/day to about 5 g/day.

In some embodiments, the kit comprises instructions directing a user to use a syringe to orally administer the solution. In some embodiments, the kit further comprises the syringe. In some embodiments, the syringe is configured to contain between 1 mL and 150 mL of a liquid.

In some embodiments, the kit comprises instructions directing a user to administer the solution through a nasogastric tube or a gastrostomy tube. In some embodiments, the kit further comprises the nasogastric tube or the gastrostomy tube.

In some embodiments, the first heteroaryl compound is thymidine and the second heteroaryl compound is deoxycytidine.

In some embodiments, the first heteroaryl compound is Compound G

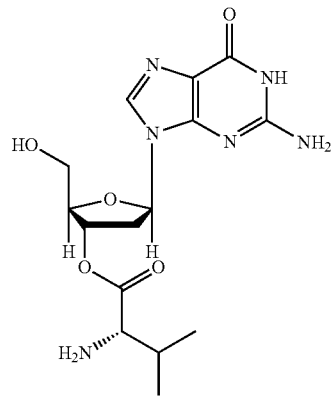

Compound G and the second heteroaryl compound is Compound A

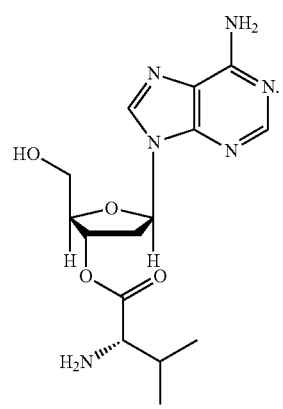

Compound A

Also provided are methods of treating a patient that include orally administering such an aqueous liquid to a patient, for example, wherein the patient has been diagnosed with a mitochondrial depletion syndrome. Kits are provided that include deoxycytidine, thymidine and optionally instructions for dissolving the nucleosides in an aqueous liquid and administering the solution to a patient.

DETAILED DESCRIPTION

Figure 1:
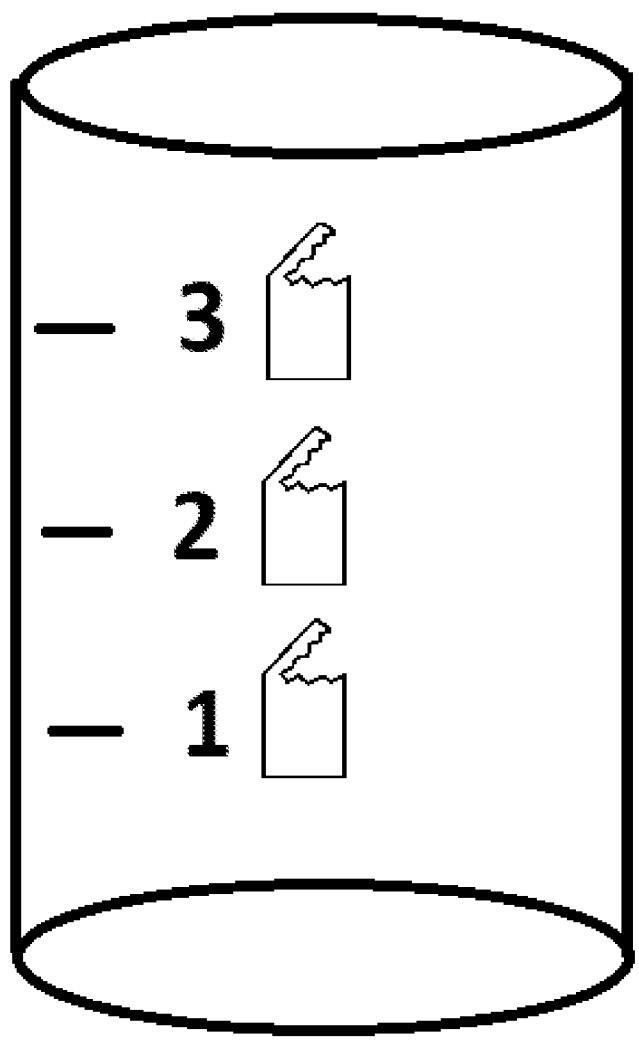
FIG. 1 shows an exemplary container having marks that indicate how many packages of nucleosides to use for a certain volume of water.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a droplet" includes a plurality of such droplets and reference to "the discrete entity" includes reference to one or more discrete entities, and so forth. It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed. To the extent the definition or usage of any term herein conflicts with a definition or usage of a term in an application or reference incorporated by reference herein, the instant application shall control.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Definitions

Deoxycytidine is sometimes abbreviated herein as "dC." As used herein, deoxycytidine and dC refer not only to the free base form of the compound, but also salts thereof. The free base of deoxycytidine has the Chemical Abstract Services (CAS) number of 951-77-9 and the chemical structure shown below.

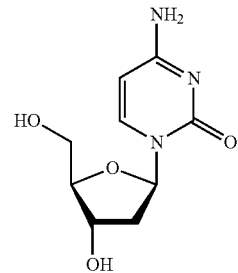 [SMILES: Nc1ccn([C@H]2C[C@@H](O)[C@@H](CO)O2)c(=O)n1]

Deoxythymidine is sometimes abbreviated herein as "dT" and is also referred herein to as "thymidine" because it is used only in assembly of DNA, not RNA, and the presence of a deoxyribose ring is assumed. As such, "thymidine" and "deoxythymidine" are used interchangeably throughout this application. As used herein, thymidine, deoxythymidine, and dT refer not only to the free base form of the compound, but also salts thereof. The free base of deoxythymidine has the CAS number of 50-89-5 and the chemical structure shown below.

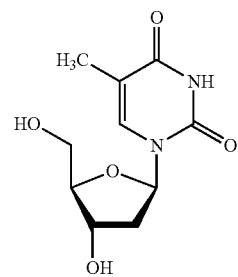 [SMILES: Cc1cn([C@H]2C[C@@H](O)[C@@H](CO)O2)c(=O)[nH]c1=O]

Uridine is sometimes abbreviated herein as "U," uridine is incorporated in RNA strands, where it pairs with adenine. As used herein, uridine and U refer not only to the free base form of the compound, but also salts thereof. The free base of uridine has the Chemical Abstract Services (CAS) number of 58-96-8 and the chemical structure shown below.

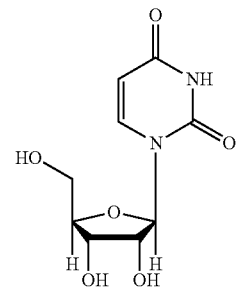

Deoxyguanosine is sometimes abbreviated herein as "dG." As used herein, deoxyguanosine and dG refer not only to the free base form of the compound, but also salts thereof. The free base of deoxyguanosine has the Chemical Abstract Services (CAS) number of 961-07-9 and the chemical structure shown below.

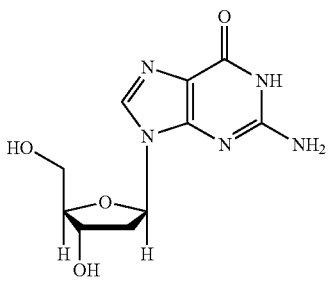

Compound G, as used herein, is a derivative of deoxyguanosine and refers to not only to the free base form of Compound G, but also salts thereof. The free base of Compound G has the chemical structure shown below.

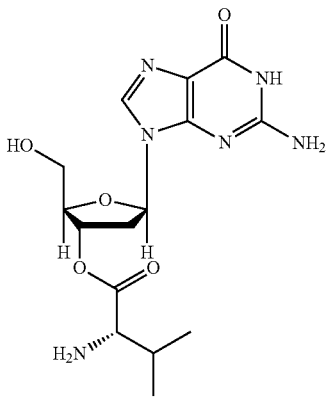

In some embodiments, Compound G can be prepared from deoxyguanosine and L-valine using methods known in the art. In some embodiments, Compound G can be prepared using protection/deprotection strategies known in the art for nucleosides, deoxynucleosides, and derivatives thereof. In some embodiments, Compound G can be prepared by selectively protecting the 5' hydroxy group of deoxyguanosine, esterifying the 3' hydroxy group with amine protected L-valine, and then removing the protecting group from the 5' hydroxy group and the amine.

Deoxyadenosine is sometimes abbreviated herein as "dA." As used herein, deoxyadenosine and dA refer not only to the free base form of the compound, but also salts thereof. The free base of deoxyadenosine has the Chemical Abstract Services (CAS) number of 958-09-8 and the chemical structure shown below.

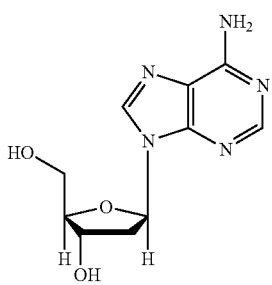

Compound A, as used herein, is a derivative of deoxyadenosine and refers to not only to the free base form of Compound A, but also salts thereof. The free base of Compound A has the chemical structure shown below.

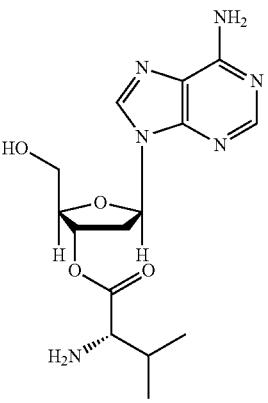

In some embodiments, Compound A can be prepared from deoxyadenosine and L-valine using methods known in the art. In some embodiments, Compound A can be prepared using protection/deprotection strategies known in the art for nucleosides, deoxynucleosides, and derivatives thereof. In some embodiments, Compound A can be prepared by selectively protecting the 5' hydroxy group of deoxyadenosine, esterifying the 3' hydroxy group with amine protected L-valine, and then removing the protecting groups from the 5' hydroxy group and the amine.

The term "aqueous composition" as used herein in its ordinary sense as understood by those skilled in the art refers to a composition as disclosed herein comprising one or more pyrimidines and/or purines, wherein the one or more pyrimidines and/or purines are dissolved in an aqueous liquid, such as water.

The term "pyrimidine" as used herein in its ordinary sense as understood by those skilled in the art, refers to an optionally substituted heterocyclic aromatic ("heteroaryl") compound that consists of one ring having the general structure below.

The term "purine" as used herein in its ordinary sense as understood by those skilled in the art, refers to an optionally substituted heteroaromatic compound that consists of two rings (pyrimidine and imidazole) fused together. Purines have the general structure below.

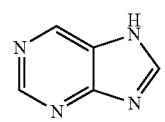

The term "nucleoside," as used herein in its ordinary sense as understood by those skilled in the art, refers to an optionally substituted compound (e.g., adenosine or cytidine) consisting of a purine or pyrimidine base linked to a sugar (e.g., a naturally occurring or synthetically modified ribose).

The term "nucleoside derivative," as used herein in its ordinary sense as understood by those skilled in the art, refers to an optionally substituted nucleoside or deoxynucleoside that has been modified, e.g., by modifying (e.g., acylating or alkylating) one or more the hydroxy groups on the sugar or by modifying the purine or pyrimidine base. An example of modifying includes adding one or more optional substituents to the nucleoside. Nucleoside derivatives include, but are not limited to, prodrugs of nucleosides and deoxynucleosides.

The term "deoxynucleoside," as used herein in its ordinary sense as understood by those skilled in the art, refers to any nucleoside containing a deoxy sugar, i.e., any compound formally derived from a sugar by replacing a hydroxy group by a hydrogen atom, e.g., deoxyribose.

The term "nucleotide," as used herein in its ordinary sense as understood by those skilled in the art, refers to an optionally substituted compound consisting of a nucleoside linked to one or more phosphate groups.

The term "deoxynucleotide," as used herein in its ordinary sense as understood by those skilled in the art, refers to any nucleotide containing a deoxy sugar, i.e., any compound formally derived from a sugar by replacing a hydroxy group by a hydrogen atom, e.g., deoxyribose.

The term "prodrug" is used herein in its ordinary sense as understood by those skilled in the art, and includes derivatives of compound disclosed herein, including, but not limited to, nucleosides, deoxynucleosides, nucleotides, and deoxynucleotides, that undergoes a transformation under the conditions of use, such as within the body, to release the nucleosides, deoxynucleosides, nucleotides, and deoxynucleotides. Prodrugs are frequently, but not necessarily, pharmacologically inactive until converted into the active form. Prodrugs can be obtained by bonding a promoiety, typically via a functional group, to a drug.

The term "purine base" is used herein in its ordinary sense as understood by those skilled in the art, and includes its tautomers. A non-limiting list of optionally substituted purine bases includes purine, adenine, guanine, hypoxanthine, xanthine, alloxanthine, 7-alkylguanine (e.g. 7-methylguanine), theobromine, caffeine, uric acid and isoguanine.

The term "pyrimidine base" is used herein in its ordinary sense as understood by those skilled in the art, and includes its tautomers. A non-limiting list of optionally substituted pyrimidine-bases include, but are not limited to, cytosine, thymine, uracil, 5,6-dihydrouracil and 5-alkylcytosine (e.g., 5-methylcytosine).

Whenever a group is described as being "optionally substituted," that group may be unsubstituted or substituted with one or more substituents. If substituted, the substituent(s) may be selected from one or more the indicated substituents. If no substituents are indicated, it is meant that the indicated "optionally substituted" or "substituted" group may be substituted with one or more group(s) individually and independently selected from, but not limited to, alkyl, alkenyl, alkynyl, cycloalkyl, cycloalkenyl, aryl, heteroaryl, heterocyclyl, aryl(alkyl), heteroaryl(alkyl), heterocyclyl(alkyl), hydroxy, =O, alkoxy, aryloxy, acyl, mercapto, alkylthio, arylthio, cyano, halogen, thiocarbonyl, 0-carbamyl, N-carbamyl, 0-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, azido, nitro, silyl, sulfenyl, sulfinyl, sulfonyl, haloalkyl, haloalkoxy, trihalomethanesulfonyl, trihalomethanesulfonamido, an amino acid, an amino, a mono-substituted amino group, a di-substituted amino group, phosphate groups (including, but not limited to, mono-, di-, and tri-phosphate groups) and protected derivatives thereof.

The term "alkyl" as used herein refers to a straight or branched hydrocarbon chain that comprises a fully saturated (no double or triple bonds) hydrocarbon group. The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 6 carbon atoms. The alkyl group of the compounds may be designated as "C1-C4 alkyl" or similar designations. By way of example only, "C1-C4 alkyl" indicates that there are one to four carbon atoms in the alkyl chain, i.e., the alkyl chain is selected from methyl, ethyl, propyl, iso-propyl, n-butyl, isobutyl, sec-butyl, and t-butyl. Typical alkyl groups include, but are in no way limited to, methyl, ethyl, propyl, isopropyl, butyl, isobutyl, tertiary butyl, pentyl and hexyl. The alkyl group may be substituted or unsubstituted.

The term "alkenyl" as used herein refers to an alkyl group that contains in the straight or branched hydrocarbon chain one or more double bonds. Examples of alkenyl groups include allenyl, vinylmethyl and ethenyl. An alkenyl group may be unsubstituted or substituted.

The term "alkynyl" as used herein refers to an alkyl group that contains in the straight or branched hydrocarbon chain one or more triple bonds. Examples of alkynyls include ethynyl and propynyl. An alkynyl group may be unsubstituted or substituted.

The term "cycloalkyl" as used herein refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s) or 3 to 8 atoms in the ring(s). A cycloalkyl group may be unsubstituted or substituted. Typical cycloalkyl groups include, but are in no way limited to, cyclopropyl, cyclobutyl, cyclopentyl, cyclohexyl, cycloheptyl and cyclooctyl.

The term "cycloalkenyl" as used herein refers to a mono- or multi-cyclic hydrocarbon ring system that contains one or more double bonds in at least one ring; although, if there is more than one, the double bonds cannot form a fully delocalized pi-electron system throughout all the rings (otherwise the group would be "aryl," as defined herein). When composed of two or more rings, the rings may be connected together in a fused fashion. A cycloalkenyl can contain 3 to 10 atoms in the ring(s) or 3 to 8 atoms in the ring(s). A cycloalkenyl group may be unsubstituted or substituted.

The term "aryl" as used herein refers to a carbocyclic (all carbon) monocyclic or multicyclic aromatic ring system (including fused ring systems where two carbocyclic rings share a chemical bond) that has a fully delocalized pi-electron system throughout all the rings. The number of carbon atoms in an aryl group can vary. For example, the aryl group can be a C6-C14 aryl group, a C6-C10 aryl group, or a C6 aryl group. Examples of aryl groups include, but are not limited to, benzene, naphthalene and azulene. An aryl group may be substituted or unsubstituted.

The term "heteroaryl" as used herein refers to a monocyclic, bicyclic and tricyclic aromatic ring system (a ring system with fully delocalized pi-electron system) that contain(s) one or more heteroatoms (for example, 1 to 5 heteroatoms), that is, an element other than carbon, including but not limited to, nitrogen, oxygen and sulfur. The number of atoms in the ring(s) of a heteroaryl group can vary. For example, the heteroaryl group can contain 4 to 14 atoms in the ring(s), 5 to 10 atoms in the ring(s) or 5 to 6 atoms in the ring(s). Furthermore, the term "heteroaryl" includes fused ring systems where two rings, such as at least one aryl ring and at least one heteroaryl ring, or at least two heteroaryl rings, share at least one chemical bond. Examples of heteroaryl rings include, but are not limited to, furan, furazan, thiophene, benzothiophene, phthalazine, pyrrole, oxazole, benzoxazole, 1,2,3-oxadiazole, 1,2,4-oxadiazole, thiazole, 1,2,3-thiadiazole, 1,2,4-thiadiazole, benzothiazole, imidazole, benzimidazole, indole, indazole, pyrazole, benzopyrazole, isoxazole, benzoisoxazole, isothiazole, triazole, benzotriazole, thiadiazole, tetrazole, pyridine, pyridazine, pyrimidine, pyrazine, purine, pteridine, quinoline, isoquinoline, quinazoline, quinoxaline, cinnoline and triazine. A heteroaryl group may be substituted or unsubstituted.

The terms "heterocyclyl" or "heteroalicyclyl" as used herein refers to three-, four-, five-, six-, seven-, eight-, nine-, ten-, up to 18-membered monocyclic, bicyclic, and tricyclic ring system wherein carbon atoms together with from 1 to 5 heteroatoms constitute said ring system. A heterocycle may optionally contain one or more unsaturated bonds situated in such a way, however, that a fully delocalized pi-electron system does not occur throughout all the rings. The heteroatom(s) is an element other than carbon including, but not limited to, oxygen, sulfur, and nitrogen. A heterocycle may further contain one or more carbonyl or thiocarbonyl functionalities, so as to make the definition include oxo-systems and thio-systems such as lactams, lactones, cyclic imides, cyclic thioamides and cyclic carbamates. When composed of two or more rings, the rings may be joined together in a fused fashion. Additionally, any nitrogens in a heteroalicyclic may be quaternized. Heterocyclyl or heteroalicyclic groups may be unsubstituted or substituted. Examples of such "heterocyclyl" or "heteroalicyclyl" groups include but are not limited to, 1,3-dioxin, 1,3-dioxane, 1,4-dioxane, 1,2-dioxolane, 1,3-dioxolane, 1,4-dioxolane, 1,3-oxathiane, 1,4-oxathiin, 1,3-oxathiolane, 1,3-dithiole, 1,3-dithiolane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-Oxide, piperidine, piperazine, pyrrolidine, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone, and their benzo-fused analogs (e.g., benzimidazolidinone, tetrahydroquinoline, and 3,4-methylenedioxyphenyl).

The terms "aralkyl" and "aryl(alkyl)" as used herein refer to an aryl group connected, as a substituent, via a lower alkylene group. The lower alkylene and aryl group of an aryl(alkyl) may be substituted or unsubstituted. Examples include but are not limited to benzyl, 2-phenyl(alkyl), 3-phenyl(alkyl), and naphthyl(alkyl).

The terms "heteroaralkyl" and "heteroaryl(alkyl)" as used herein refer to a heteroaryl group connected, as a substituent, via a lower alkylene group. The lower alkylene and heteroaryl group of heteroaryl(alkyl) may be substituted or unsubstituted. Examples include but are not limited to 2-thienyl(alkyl), 3-thienyl(alkyl), furyl(alkyl), thienyl(alkyl), pyrrolyl(alkyl), pyridyl(alkyl), isoxazolyl(alkyl), imidazolyl(alkyl), and their benzo-fused analogs.

The term "alkoxy" as used herein refers to the formula OR wherein R is an alkyl, an alkenyl, an alkynyl, a cycloalkyl, a cycloalkenyl, aryl, heteroaryl, heteroalicyclyl, aralkyl, heteroaryl(alkyl) or heterocyclyl(alkyl) is defined herein. A non-limiting list of alkoxys are methoxy, ethoxy, n-propoxy, 1-methylethoxy (isopropoxy), n-butoxy, iso-butoxy, sec-butoxy, tert-butoxy, phenoxy and benzoxy. An alkoxy may be substituted or unsubstituted.

The term "acyl" as used herein refers to a hydrogen, an alkyl, an alkenyl, an alkynyl, a cycloalkyl, a cycloalkenyl, aryl, heteroaryl, heteroalicyclyl, aralkyl, heteroaryl(alkyl), heterocyclyl(alkyl), or an amino acid connected, as substituents, via a carbonyl group (e.g., through an ester linkage). Examples include formyl, acetyl, propanoyl, benzoyl, and acryl. An acyl may be substituted or unsubstituted.

The term "amino acid" as used herein refers to any amino acid (both standard and non-standard amino acids), including, but not limited to, α-amino acids, β-amino acids, γ-amino acids and δ-amino acids. Examples of suitable amino acids include, but are not limited to, alanine, asparagine, aspartate, cysteine, glutamate, glutamine, glycine, proline, serine, tyrosine, arginine, histidine, isoleucine, leucine, lysine, methionine, phenylalanine, threonine, tryptophan and valine. Additional examples of suitable amino acids include, but are not limited to, ornithine, hypusine, 2-aminoisobutyric acid, dehydroalanine, gamma-aminobutyric acid, citrulline, beta-alanine, alpha-ethyl-glycine, alpha-propyl-glycine and norleucine.

The term "amino acid" as used herein includes naturally occurring and synthetic, β γ or δ amino acids, The amino acid can be in the D- or L-configuration. The amino acid can be a derivative of alanyl, valinyl, leucinyl, isoleuccinyl, prolinyl, phenylalaninyl, tryptophanyl, methioninyl, glycinyl, serinyl, threoninyl, cysteinyl, tyrosinyl, asparaginyl, glutaminyl, aspartoyl, glutaroyl, lysinyl, argininyl, histidinyl, β-alanyl, β-valinyl, β-leucinyl, β-isoleuccinyl, β-prolinyl, β-phenylalaninyl, β-tryptophanyl, β-methioninyl, β-glycinyl, β-serinyl, β-threoninyl, β-cysteinyl, β-tyrosinyl, β-asparaginyl, β-glutaminyl, β-aspartoyl, β-glutaroyl, β-lysinyl, β-argininyl or β-histidinyl.

The term "about," as used herein in its ordinary sense as understood by those skilled in the art, includes the recited number±10%. Thus, "about 10" means 9 to 11. As is understood by one skilled in the art, reference to "about" a value or parameter herein includes (and describes) instances that are directed to that value or parameter per se. For example, description referring to "about X" includes description of "X."

The term "ribose sugar" as used herein in its ordinary sense as understood by those skilled in the art, includes groups having the structure below

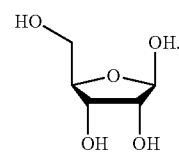

The term "deoxyribose sugar" as used herein in its ordinary sense as understood by those skilled in the art, includes groups having the structure below

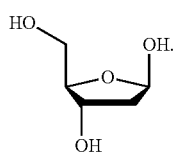

The term "dose unit" as used herein in its ordinary sense as understood by those skilled in the art, refers to an individual unit (e.g., packet, pack, package, sachet, stick, stick pack, etc.), containing a specified amount of the first heteroaryl compound and/or a specified amount of the second heteroaryl compound. In some embodiments, the compositions disclosed herein are prepared by adding specified volumes of liquid (e.g., aqueous liquids or water) to the dose units.

When referring to administration of a compound to a subject, the terms "dose," "amount," and "dosage" are used interchangeably. The units of mg/kg/day refers to how many milligrams of a compound is administered to the subject within a 24 hour period per kilogram of body mass of the patient. For example, a patient weighing 100 kg and receiving 200 mg/kg/day of deoxycytidine would receive 20,000 mg of deoxycytidine within a 24 hour period. The units mg/kg/day can also be written as mg/(kg·day) or mg·kg$^{-1}$·day$^{-1}$.

"Administering target doses" can also be referred to as "target doses administration" or "target administration." Similarly, administering first doses can also be referred to as the first administration, and administering second doses can also be referred to as the second administration. Administering adjusted doses can be alternatively referred to as the adjusted administration.

The terms active agent, active pharmaceutical ingredient, pharmacologically active agent, and drug are used interchangeably herein to refer to a chemical material or compound which, when administered to an organism (human or animal) induces a desired pharmacologic and/or physiologic effect by local and/or systemic action. In some embodiments, the purines and pyrimidines disclosed herein (e.g., deoxycytidine, thymidine, Compound G, and Compound A), are active agents, active pharmaceutical ingredients, pharmacologically active agents, and drugs.

The terms "individual," "host," "subject," and "patient" are used interchangeably herein, and refer to a human of any age, including "infants" (birth through 2 years), "children" (from 3 up to 10 years), "adolescents" (10 to 19 years) and "adults" (20 years and older). Non-human animal models, e.g., mammals, e.g. non-human primates, murines, lagomorpha, etc. may be used for experimental and non-clinical investigations.

As used herein, the terms "treatment," "treating," and the like, refer to obtaining a desired pharmacologic and/or physiologic effect, such as reduction of viral titer. The effect may be prophylactic in terms of completely or partially preventing a disease or symptom thereof and/or may be therapeutic in terms of a partial or complete cure for a disease and/or adverse symptom attributable to the disease. "Treatment," as used herein, covers any treatment of a disease in a mammal, particularly in a human, and includes: (a) preventing the disease or a symptom of a disease from occurring in a subject which may be predisposed to the disease but has not yet been diagnosed as having it (e.g., including diseases that may be associated with or caused by a primary disease (as in liver fibrosis that can result in the context of chronic HCV infection); (b) inhibiting the disease, i.e., arresting its development; and (c) relieving the disease, i.e., causing regression of the disease (e.g., reduction in viral titers or improvement in disease biomarkers). The age at onset of symptoms, rate of weakness progression and post-onset survival are defining variables of three clinical subtypes of TK2 deficiency. The subtypes are classified as infantile-onset myopathy (birth to two years of age), childhood-onset myopathy (between 3 years and 12 years) and late on-set disease. Nervous system involvement often complicates the clinical course of the infantile-onset form which typically progresses faster to disability and death while extraocular muscle and facial involvement are characteristic of the late-onset form along with a longer post-onset survival time.

A "therapeutically effective dose," a "therapeutically effective dose" or "therapeutic dose" is a dose sufficient to effect desired clinical results (i.e., achieve therapeutic efficacy, achieve a desired therapeutic response, etc.). A therapeutically effective dose can be administered in one or more administrations. For purposes of this disclosure, a therapeutically effective dose of a compositions is a dose that is sufficient, when administered to the individual, to palliate, ameliorate, stabilize, reverse, prevent, slow or delay the progression of a disease state (e.g., cancer, etc.) present in the subject.

As used herein, the terms "monitoring," "determining," "measuring," "assessing," and "assaying" are used interchangeably and include both quantitative and qualitative determinations.

Compositions

In some embodiments, provided is a composition comprising a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound.

In some embodiments, the first heteroaryl compound and the second heteroaryl compound are selected from optionally substituted pyrimidines and optionally substituted purines.

In some embodiments, the optionally substituted pyrimidines and optionally substituted purines are chosen from deoxynucleosides, deoxynucleotides having from 1 to 3 phosphate groups, nucleosides, nucleotides having from 1 to 3 phosphate groups, and prodrugs of any of the foregoing. In some embodiments, the optionally substituted pyrimidines and optionally substituted purines are chosen from deoxynucleosides. In some embodiments, the optionally substituted pyrimidines and optionally substituted purines are chosen from deoxynucleotides having from 1 to 3 phosphate groups. In some embodiments, the optionally substituted pyrimidines and optionally substituted purines are chosen from nucleosides. In some embodiments, the optionally substituted pyrimidines and optionally substituted purines are chosen from nucleotides having from 1 to 3 phosphate groups.

In some embodiments, the optionally substituted pyrimidines and optionally substituted purines are chosen from prodrugs of deoxynucleosides. In some embodiments, the optionally substituted pyrimidines and optionally substituted purines are chosen from prodrugs of deoxynucleotides having from 1 to 3 phosphate groups. In some embodiments, the optionally substituted pyrimidines and optionally substituted purines are chosen from prodrugs of nucleosides. In some embodiments, the optionally substituted pyrimidines and optionally substituted purines are chosen from prodrugs of nucleotides having from 1 to 3 phosphate groups.

In some embodiments, the optionally substituted pyrimidine is an optionally substituted uridine. In some embodiments, the pyrimidine is uridine.

In some embodiments, the optionally substituted pyrimidine is an optionally substituted deoxyuridine. In some embodiments, the pyrimidine is deoxyuridine.

In some embodiments, the optionally substituted pyrimidines have a structure of Formula I below;

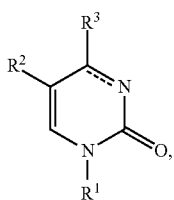

Formula I or a tautomer thereof, wherein $R^1$ is selected from hydrogen or optionally substituted heterocyclyl;

$R^2$ is selected from hydrogen or optionally substituted alkyl;

$R^3$ is selected from hydrogen, amino, hydroxy, —$OR^5$, —$NHR^6$, or carbonyl;

$R^5$ is selected from hydrogen, halogen, optionally substituted alkyl, or optionally substituted aralkyl; and $R^6$ is selected from hydrogen, optionally substituted alkyl, optionally substituted aralkyl, —C(O)N($R^7$)($R^{7'}$), —C(O)$OR^8$, or —$R^9$;

$R^7$, $R^{7'}$, $R^8$, and $R^{10}$ are each independently selected from hydrogen, optionally substituted $C_1$-$C_{10}$ alkyl, optionally substituted $C_2$-$C_{10}$ alkenyl, optionally substituted $C_3$-$C_{10}$ cycloalkyl, optionally substituted 3-10 membered heterocyclyl, optionally substituted aryl, or optionally substituted heteroaryl;

$R^9$ is

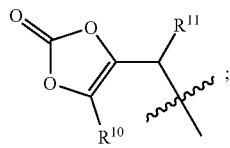

$R^{11}$ is selected from hydrogen, optionally substituted $C_1$-$C_{10}$ alkyl, and optionally substituted $C_2$-$C_{10}$ alkenyl; and represents a single or double bond.

In some embodiments, the optionally substituted pyrimidines have a structure of Formula II below;

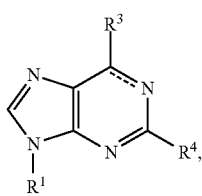

Formula II or a tautomer thereof, wherein $R^1$, $R^2$, $R^3$, $R^5$, $R^6$, $R^7$, $R^{7'}$, $R^8$, $R^9$, and $R^{10}$ are defined as above;

$R^4$ is selected from hydrogen, halogen, amino, hydroxy, alkyl, and —$NHR^6$; and represents a single or double bond.

In some embodiments, $R^1$ is an optionally substituted 5-membered heterocyclyl. In some embodiments, $R^1$ is an optionally substituted 6-membered heterocyclyl. In some embodiments, $R^1$ is an optionally substituted 5- or 6-membered heterocyclyl, wherein the heterocyclyl includes one or more oxygen atoms, one or more nitrogen atoms, one or more sulfur atoms, or mixtures thereof as heteroatoms. In some embodiments, $R^1$ is an optionally substituted tetrahydrofuran. In some embodiments, $R^1$ is optionally substituted by an acyl group. In some embodiments, the acyl group is —C(O)$R^{12}$, wherein $R^{12}$ is selected from alkyl, alkenyl, alkynyl, cycloalkyl, aryl, heteroaryl, and heterocyclyl. In some embodiments, the acyl group is an amino acid.

In some embodiments, $R^1$ is optionally substituted by a phosphate group. In some embodiments, $R^1$ is optionally substituted by a monophosphate. In some embodiments, $R^1$ is optionally substituted by a diphosphate. In some embodiments, $R^1$ is optionally substituted by a triphosphate.

In some embodiments, $R^1$ is an optionally substituted sugar moiety. In some embodiments, $R^1$ is an optionally substituted ribose sugar. In some embodiments, $R^1$ is an optionally substituted 2-deoxyribose radical (IUPAC nomenclature: (2R,3S)-2-(hydroxymethyl)oxolan-3-ol). In some embodiments, $R^1$ is an optionally substituted ribose radical (IUPAC nomenclature: (2R,3S,4S)-2-(hydroxymethyl)oxolane-3,4-diol). In some embodiments, the ribose sugar is substituted at one or more positions by an acyl group. In some embodiments, the acyl group is —C(O)$R^{12}$, wherein $R^{12}$ is selected from alkyl, alkenyl, alkynyl, cycloalkyl, aryl, heteroaryl, and heterocyclyl. In some embodiments, the acyl group is an amino acid. In some embodiments, the ribose sugar is substituted at one or more positions by a phosphate group. In some embodiments, the ribose sugar is substituted at one or more positions by a monophosphate. In some embodiments, the ribose sugar is substituted at one or more positions by a diphosphate. In some embodiments, the ribose sugar is substituted at one or more positions by a triphosphate. In some embodiments, the ribose sugar is substituted at one or more positions by a cyclic phosphate.

In some embodiments, $R^2$ is hydrogen. In some embodiments, $R^2$ is optionally substituted alkyl. In some embodiments, $R^2$ is optionally substituted $C_1$-$C_5$ alkyl. In some embodiments, $R^2$ is selected from methyl, ethyl, isopropyl, and n-propyl. In some embodiments, $R^2$ is methyl.

In some embodiments, $R^3$ is hydrogen. In some embodiments, $R^3$ is amino. In some embodiments, $R^3$ is hydroxy. In some embodiments, $R^3$ is —$OR^5$. In some embodiments, $R^3$ is -$NHR^6$.

In some embodiments, $R^4$ is hydrogen. In some embodiments, $R^4$ is halogen. In some embodiments, the halogen is selected from chlorine, bromine, fluorine, and iodine. In some embodiments, the halogen is chlorine. In some embodiments, the halogen is bromine.

In some embodiments, $R^4$ is amino. In some embodiments, $R^4$ is hydroxy. In some embodiments, $R^4$ is optionally substituted alkyl. In some embodiments, $R^4$ is optionally substituted $C_1$-$C_5$ alkyl. In some embodiments, $R^4$ is selected from methyl, ethyl, isopropyl, and n-propyl. In some embodiments, $R^4$ is methyl.

In some embodiments, $R^5$ is hydrogen. In some embodiments, $R^5$ is halogen. In some embodiments, the halogen is selected from chlorine, bromine, fluorine, and iodine. In some embodiments, the halogen is chlorine. In some embodiments, the halogen is bromine.

In some embodiments, $R^5$ is optionally substituted alkyl. In some embodiments, $R^5$ is optionally substituted $C_1$-$C_5$ alkyl. In some embodiments, $R^5$ is selected from methyl, ethyl, isopropyl, and n-propyl. In some embodiments, $R^5$ is methyl. In some embodiments, $R^5$ is optionally substituted aralkyl. In some embodiments, $R^5$ is optionally substituted benzyl.

In some embodiments, $R^6$ is hydrogen. In some embodiments, $R^6$ is optionally substituted alkyl. In some embodiments, $R^6$ is optionally substituted $C_1$-$C_5$ alkyl. In some embodiments, $R^6$ is selected from methyl, ethyl, isopropyl, and n-propyl. In some embodiments, $R^6$ is methyl. In some embodiments, $R^6$ is optionally substituted aralkyl. In some embodiments, $R^6$ is optionally substituted benzyl. In some embodiments, $R^6$ is —C(O)N($R^7$)($R^{7'}$). In some embodiments, $R^6$ is —C(O)O$R^8$. In some embodiments, $R^6$ is-$R^9$.

In some embodiments, $R^7$ is hydrogen. In some embodiments, $R^7$ is optionally substituted $C_1$-$C_{10}$ alkyl. In some embodiments, $R^7$ is optionally substituted $C_1$-$C_5$ alkyl. In some embodiments, $R^7$ is selected from methyl, ethyl, isopropyl, and n-propyl. In some embodiments, $R^7$ is optionally substituted $C_2$-$C_{10}$ alkenyl. In some embodiments, $R^7$ is optionally substituted $C_2$-$C_5$ alkenyl. In some embodiments, $R^7$ is optionally substituted $C_3$-$C_{10}$ cycloalkyl. In some embodiments, $R^7$ is optionally substituted $C_5$ or $C_6$ cycloalkyl. In some embodiments, $R^7$ is optionally substituted $C_5$ cycloalkyl. In some embodiments, $R^7$ is optionally substituted $C_6$ cycloalkyl. In some embodiments, $R^7$ is optionally substituted 3-10 membered heterocyclyl. In some embodiments, $R^7$ is a optionally substituted 5-membered heterocyclyl. In some embodiments, $R^7$ is a optionally substituted 6-membered heterocyclyl. In some embodiments, $R^7$ is optionally substituted aryl. In some embodiments, $R^7$ is a optionally substituted phenyl. In some embodiments, $R^7$ is optionally substituted heteroaryl. In some embodiments, $R^7$ is optionally substituted 5- or 6-membered heteroaryl. In some embodiments, $R^7$ is optionally substituted 5-membered heteroaryl. In some embodiments, $R^7$ is optionally substituted 6-membered heteroaryl.

In some embodiments, $R^{7'}$ is hydrogen. In some embodiments, $R^{7'}$ is optionally substituted $C_1$-$C_{10}$ alkyl. In some embodiments, $R^{7'}$ is optionally substituted $C_1$-$C_5$ alkyl. In some embodiments, $R^{7'}$ is selected from methyl, ethyl, isopropyl, and n-propyl. In some embodiments, $R^{7'}$ is optionally substituted $C_2$-$C_{10}$ alkenyl. In some embodiments, $R^{7'}$ is optionally substituted $C_2$-$C_5$ alkenyl. In some embodiments, $R^{7'}$ is optionally substituted $C_3$-$C_{10}$ cycloalkyl. In some embodiments, $R^{7'}$ is optionally substituted $C_5$ or $C_6$ cycloalkyl. In some embodiments, $R^{7'}$ is optionally substituted $C_5$ cycloalkyl. In some embodiments, $R^{7'}$ is optionally substituted $C_6$ cycloalkyl. In some embodiments, $R^{7'}$ is optionally substituted 3-10 membered heterocyclyl. In some embodiments, $R^{7'}$ is a optionally substituted 5-membered heterocyclyl. In some embodiments, $R^{7'}$ is a optionally substituted 6-membered heterocyclyl. In some embodiments, $R^{7'}$ is optionally substituted aryl. In some embodiments, $R^{7'}$ is a optionally substituted phenyl. In some embodiments, $R^{7'}$ is optionally substituted heteroaryl. In some embodiments, $R^{7'}$ is optionally substituted 5- or 6-membered heteroaryl. In some embodiments, $R^{7'}$ is optionally substituted 5-membered heteroaryl. In some embodiments, $R^{7'}$ is optionally substituted 6-membered heteroaryl.

In some embodiments, $R^8$ is hydrogen. In some embodiments, $R^8$ is optionally substituted $C_1$-$C_{10}$ alkyl. In some embodiments, $R^8$ is optionally substituted $C_1$-$C_5$ alkyl. In some embodiments, $R^8$ is selected from methyl, ethyl, isopropyl, and n-propyl. In some embodiments, $R^8$ is optionally substituted $C_2$-$C_{10}$ alkenyl. In some embodiments, $R^8$ is optionally substituted $C_2$-$C_5$ alkenyl. In some embodiments, $R^8$ is optionally substituted $C_3$-$C_{10}$ cycloalkyl. In some embodiments, $R^8$ is optionally substituted $C_5$ or $C_6$ cycloalkyl. In some embodiments, $R^8$ is optionally substituted $C_5$ cycloalkyl. In some embodiments, $R^8$ is optionally substituted $C_6$ cycloalkyl. In some embodiments, $R^8$ is optionally substituted 3-10 membered heterocyclyl. In some embodiments, $R^8$ is a optionally substituted 5-membered heterocyclyl. In some embodiments, $R^8$ is a optionally substituted 6-membered heterocyclyl. In some embodiments, $R^8$ is optionally substituted aryl. In some embodiments, $R^8$ is a optionally substituted phenyl. In some embodiments, $R^8$ is optionally substituted heteroaryl. In some embodiments, $R^8$ is optionally substituted 5- or 6-membered heteroaryl. In some embodiments, $R^8$ is optionally substituted 5-membered heteroaryl. In some embodiments, $R^8$ is optionally substituted 6-membered heteroaryl.

In some embodiments, $R^{10}$ is hydrogen. In some embodiments, $R^{10}$ is optionally substituted $C_1$-$C_{10}$ alkyl. In some embodiments, $R^{10}$ is optionally substituted $C_1$-$C_5$ alkyl. In some embodiments, $R^{10}$ is selected from methyl, ethyl, isopropyl, and n-propyl. In some embodiments, $R^{10}$ is methyl. In some embodiments, $R^{10}$ is optionally substituted $C_2$-$C_{10}$ alkenyl. In some embodiments, $R^{10}$ is optionally substituted $C_2$-$C_5$ alkenyl. In some embodiments, $R^{10}$ is optionally substituted $C_3$-$C_{10}$ cycloalkyl. In some embodiments, $R^{10}$ is optionally substituted $C_5$ or $C_6$ cycloalkyl. In some embodiments, $R^{10}$ is optionally substituted $C_5$ cycloalkyl. In some embodiments, $R^{10}$ is optionally substituted $C_6$ cycloalkyl. In some embodiments, $R^{10}$ is optionally substituted 3-10 membered heterocyclyl. In some embodiments, $R^{10}$ is a optionally substituted 5-membered heterocyclyl. In some embodiments, $R^{10}$ is a optionally substituted 6-membered heterocyclyl. In some embodiments, $R^{10}$ is optionally substituted aryl. In some embodiments, $R^{10}$ is a optionally substituted phenyl. In some embodiments, $R^{10}$ is optionally substituted heteroaryl. In some embodiments, $R^{10}$ is optionally substituted 5- or 6-membered heteroaryl. In some embodiments, $R^{10}$ is optionally substituted 5-membered heteroaryl. In some embodiments, $R^{10}$ is optionally substituted 6-membered heteroaryl.

In some embodiments, $R^{11}$ is hydrogen. In some embodiments, $R^{11}$ is optionally substituted $C_1$-$C_{10}$ alkyl. In some embodiments, $R^{11}$ is optionally substituted $C_1$-$C_5$ alkyl. In some embodiments, $R^{11}$ is selected from methyl, ethyl, isopropyl, and n-propyl. In some embodiments, $R^{11}$ is optionally substituted $C_2$-$C_{10}$ alkenyl. In some embodiments, $R^{11}$ is optionally substituted $C_2$-$C_5$ alkenyl.

In some embodiments, $R^9$ is wherein $R^{10}$ is optionally substituted alkyl and $R^{11}$ is hydrogen.

In some embodiments, $R^9$ is

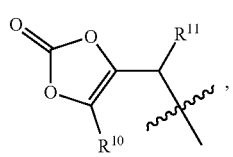

wherein $R^{10}$ is methyl and $R^{11}$ is hydrogen.

In some embodiments, the optionally substituted pyrimidines have Formula Ia

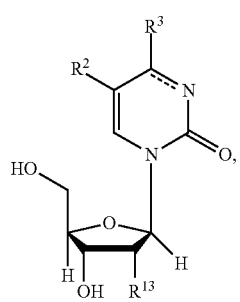

Formula Ia wherein $R^2$ is selected from hydrogen or $C_1$-$C_4$ alkyl;
$R^3$ is selected from hydrogen, amino, hydroxy, —$OR^5$, —$NHR^6$, or carbonyl;
$R^5$ is selected from hydrogen, halogen, optionally substituted alkyl, or optionally substituted aralkyl;
$R^6$ is selected from hydrogen, optionally substituted alkyl, optionally substituted aralkyl, —C(O)N($R^7$)($R^{7'}$), —C(O)$OR^8$, or —$R^9$;
$R^7$, $R^{7'}$, $R^8$, and $R^{10}$ are each independently selected from hydrogen, optionally substituted $C_1$-$C_{10}$ alkyl, optionally substituted $C_2$-$C_{10}$ alkenyl, optionally substituted $C_3$-$C_{10}$ cycloalkyl, optionally substituted 3-10 membered heterocyclyl, optionally substituted aryl, or optionally substituted heteroaryl;
$R^9$ is

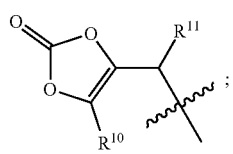

$R^{11}$ is selected from hydrogen, optionally substituted $C_1$-$C_{10}$ alkyl, and optionally substituted $C_2$-$C_{10}$ alkenyl;
$R^{13}$ is hydrogen or hydroxy; and
⁓ represents a single or double bond.

In some embodiments, the optionally substituted purines have Formula IIa

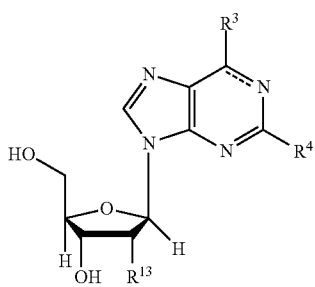

Formula IIa wherein $R^3$ is selected from hydrogen, amino, hydroxy, —$OR^5$, —$NHR^6$, or carbonyl,
$R^4$ is selected from hydrogen, amino, or —$NHR^6$,
$R^5$ is selected from hydrogen, halogen, optionally substituted alkyl, or optionally substituted aralkyl;
$R^6$ is selected from hydrogen, optionally substituted alkyl, optionally substituted aralkyl, —C(O)N($R^7$)($R^{7'}$), —C(O)$OR^8$, or —$R^9$;
$R^7$, $R^{7'}$, $R^8$, and $R^{10}$ are each independently selected from hydrogen, optionally substituted $C_1$-$C_{10}$ alkyl, optionally substituted $C_2$-$C_{10}$ alkenyl, optionally substituted $C_3$-$C_{10}$ cycloalkyl, optionally substituted 3-10 membered heterocyclyl, optionally substituted aryl, or optionally substituted heteroaryl;
$R^9$ is

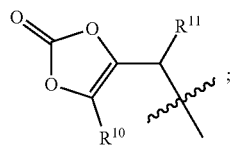

$R^{11}$ is selected from hydrogen, optionally substituted $C_1$-$C_{10}$ alkyl, and optionally substituted $C_2$-$C_{10}$ alkenyl;
$R^{13}$ is hydrogen or hydroxy; and
⁓ represents a single or double bond.

In some embodiments, the compositions comprise two purines in a molar ratio of about 20:1 to about 1:20. In some embodiments, the compositions comprise two purines in a molar ratio of about 15:1 to about 1:15. In some embodiments, the compositions comprise two purines in a molar ratio of about 10:1 to about 1:10. In some embodiments, the compositions comprise two purines in a molar ratio of about 1:1 to about 1:10. In some embodiments, the compositions comprise two purines in a molar ratio of about 10:1 to about 1:1. In some embodiments, the compositions comprise two purines in a molar ratio of about 1:0.1 to about 1:1. In some embodiments, the compositions comprise two purines in a molar ratio of about 1:0.2 to about 1:1. In some embodiments, the compositions comprise two purines in a molar ratio of about 1:0.3 to about 1:1. In some embodiments, the compositions comprise two purines in a molar ratio of about 1:0.4 to about 1:1. In some embodiments, the compositions comprise two purines in a molar ratio of about 1:0.5 to about 1:1. In some embodiments, the compositions comprise two purines in a molar ratio of about 1:0.1. In some embodiments, the compositions comprise two purines in a molar ratio of about 1:0.2. In some embodiments, the compositions comprise two purines in a molar ratio of about 1:0.3. In some embodiments, the compositions comprise two purines in a molar ratio of about 1:0.4. In some embodiments, the compositions comprise two purines in a molar ratio of about 1:0.5. In some embodiments, the compositions comprise two purines in a molar ratio of about 1:0.6. In some embodiments, the compositions comprise two purines in a molar ratio of about 1:0.7. In some embodiments, the compositions comprise two purines in a molar ratio of about 1:0.8. In some embodiments, the compositions comprise two purines in a molar ratio of about 1:0.9. In some embodiments, the compositions comprise two purines in a molar ratio of about 1:1.

In some embodiments, the compositions comprise two pyrimidines in a molar ratio of about 20:1 to about 1:20. In some embodiments, the compositions comprise two pyrimidines in a molar ratio of about 15:1 to about 1:15. In some embodiments, the compositions comprise two pyrimidines in a molar ratio of about 10:1 to about 1:10. In some embodiments, the compositions comprise two pyrimidines in a molar ratio of about 1:1 to about 1:10. In some embodiments, the compositions comprise two pyrimidines in a molar ratio of about 10:1 to about 1:1. In some embodiments, the compositions comprise two pyrimidines in a molar ratio of about 1:0.1 to about 1:1. In some embodiments, the compositions comprise two pyrimidines in a molar ratio of about 1:0.2 to about 1:1. In some embodiments, the compositions comprise two pyrimidines in a molar ratio of about 1:0.3 to about 1:1. In some embodiments, the compositions comprise two pyrimidines in a molar ratio of about 1:0.4 to about 1:1. In some embodiments, the compositions comprise two pyrimidines in a molar ratio of about 1:0.5 to about 1:1. In some embodiments, the compositions comprise two pyrimidines in a molar ratio of about 1:0.1. In some embodiments, the compositions comprise two pyrimidines in a molar ratio of about 1:0.2. In some embodiments, the compositions comprise two pyrimidines in a molar ratio of about 1:0.3. In some embodiments, the compositions comprise two pyrimidines in a molar ratio of about 1:0.4. In some embodiments, the compositions comprise two pyrimidines in a molar ratio of about 1:0.5. In some embodiments, the compositions comprise two pyrimidines in a molar ratio of about 1:0.6. In some embodiments, the compositions comprise two pyrimidines in a molar ratio of about 1:0.7. In some embodiments, the compositions comprise two pyrimidines in a molar ratio of about 1:0.8. In some embodiments, the compositions comprise two pyrimidines in a molar ratio of about 1:0.9. In some embodiments, the compositions comprise two pyrimidines in a molar ratio of about 1:1.

In some embodiments, the compositions comprise a purine and a pyrimidine in a molar ratio of about 20:1 to about 1:20, respectively. In some embodiments, the compositions comprise a purine and a pyrimidine in a molar ratio of about 15:1 to about 1:15, respectively. In some embodiments, the compositions comprise a purine and a pyrimidine in a molar ratio of about 10:1 to about 1:10, respectively. In some embodiments, the compositions comprise a purine and a pyrimidine in a molar ratio of about 1:1 to about 1:10, respectively. In some embodiments, the compositions comprise a purine and a pyrimidine in a molar ratio of about 10:1 to about 1:1, respectively. In some embodiments, the compositions comprise a purine and a pyrimidine in a molar ratio of about 1:0.1 to about 1:1, respectively. In some embodiments, the compositions comprise a purine and a pyrimidine in a molar ratio of about 1:0.2 to about 1:1, respectively. In some embodiments, the compositions comprise a purine and a pyrimidine in a molar ratio of about 1:0.3 to about 1:1, respectively. In some embodiments, the compositions comprise a purine and a pyrimidine in a molar ratio of about 1:0.4 to about 1:1, respectively. In some embodiments, the compositions comprise a purine and a pyrimidine in a molar ratio of about 1:0.5 to about 1:1, respectively. In some embodiments, the compositions comprise a purine and a pyrimidine in a molar ratio of about 1:0.1, respectively. In some embodiments, the compositions comprise a purine and a pyrimidine in a molar ratio of about 1:0.2, respectively. In some embodiments, the compositions comprise a purine and a pyrimidine in a molar ratio of about 1:0.3, respectively. In some embodiments, the compositions comprise a purine and a pyrimidine in a molar ratio of about 1:0.4, respectively. In some embodiments, the compositions comprise a purine and a pyrimidine in a molar ratio of about 1:0.5, respectively. In some embodiments, the compositions comprise a purine and a pyrimidine in a molar ratio of about 1:0.6, respectively. In some embodiments, the compositions comprise a purine and a pyrimidine in a molar ratio of about 1:0.7, respectively. In some embodiments, the compositions comprise a purine and a pyrimidine in a molar ratio of about 1:0.8, respectively. In some embodiments, the compositions comprise a purine and a pyrimidine in a molar ratio of about 1:0.9, respectively. In some embodiments, the compositions comprise a purine and a pyrimidine in a molar ratio of about 1:1, respectively.

In some embodiments, the compositions comprise a pyrimidine and a purine in a molar ratio of about 20:1 to about 1:20, respectively. In some embodiments, the compositions comprise a pyrimidine and a purine in a molar ratio of about 15:1 to about 1:15, respectively. In some embodiments, the compositions comprise a pyrimidine and a purine in a molar ratio of about 10:1 to about 1:10, respectively. In some embodiments, the compositions comprise a pyrimidine and a purine in a molar ratio of about 1:1 to about 1:10, respectively. In some embodiments, the compositions comprise a pyrimidine and a purine in a molar ratio of about 10:1 to about 1:1, respectively. In some embodiments, the compositions comprise a pyrimidine and a purine in a molar ratio of about 1:0.1 to about 1:1, respectively. In some embodiments, the compositions comprise a pyrimidine and a purine in a molar ratio of about 1:0.2 to about 1:1, respectively. In some embodiments, the compositions comprise a pyrimidine and a purine in a molar ratio of about 1:0.3 to about 1:1, respectively. In some embodiments, the compositions comprise a pyrimidine and a purine in a molar ratio of about 1:0.4 to about 1:1, respectively. In some embodiments, the compositions comprise a pyrimidine and a purine in a molar ratio of about 1:0.5 to about 1:1, respectively. In some embodiments, the compositions comprise a pyrimidine and a purine in a molar ratio of about 1:0.1, respectively. In some embodiments, the compositions comprise a pyrimidine and a purine in a molar ratio of about 1:0.2, respectively. In some embodiments, the compositions comprise a pyrimidine and a purine in a molar ratio of about 1:0.3, respectively. In some embodiments, the compositions comprise a pyrimidine and a purine in a molar ratio of about 1:0.4, respectively. In some embodiments, the compositions comprise a pyrimidine and a purine in a molar ratio of about 1:0.5, respectively. In some embodiments, the compositions comprise a pyrimidine and a purine in a molar ratio of about 1:0.6, respectively. In some embodiments, the compositions comprise a pyrimidine and a purine in a molar ratio of about 1:0.7, respectively. In some embodiments, the compositions comprise a pyrimidine and a purine in a molar ratio of about 1:0.8, respectively. In some embodiments, the compositions comprise a pyrimidine and a purine in a molar ratio of about 1:0.9, respectively. In some embodiments, the compositions comprise a pyrimidine and a purine in a molar ratio of about 1:1, respectively.

As described above, in some embodiments, the present disclosure provides compositions comprising thymidine and deoxycytidine dissolved in an aqueous liquid. For instance, in some embodiments, the aqueous liquid can be water, e.g. tap water or bottled water, or a fruit juice.

In some embodiments, the mass of the first heteroaryl compound ranges from about 0.5 g to 10.0 g per dose unit. In some embodiments, the mass of the first heteroaryl compound ranges from about 0.5 g to 8.0 g per dose unit. In some embodiments, the mass of the first heteroaryl compound ranges from about 0.5 g to 6.0 g per dose unit. In some embodiments, the mass of the first heteroaryl compound ranges from about 0.5 g to 5.0 g per dose unit. In some embodiments, the mass of the first heteroaryl compound ranges from about 0.5 g to 4.0 g per dose unit. In some embodiments, the mass of the first heteroaryl compound is about 0.5 g per dose unit. In some embodiments, the mass of the first heteroaryl compound is about 1.0 g per dose unit. In some embodiments, the mass of the first heteroaryl compound is about 1.5 g per dose unit. In some embodiments, the mass of the first heteroaryl compound is about 2.0 g per dose unit. In some embodiments, the mass of the first heteroaryl compound is about 2.5 g per dose unit. In some embodiments, the mass of the first heteroaryl compound is about 3.0 g per dose unit. In some embodiments, the mass of the first heteroaryl compound is about 3.5 g per dose unit. In some embodiments, the mass of the first heteroaryl compound is about 4.0 g per dose unit. In some embodiments, the mass of the first heteroaryl compound is about 4.5 g per dose unit. In some embodiments, the mass of the first heteroaryl compound is about 5.0 g per dose unit. In some embodiments, the mass of the first heteroaryl compound is about 5.5 g per dose unit. In some embodiments, the mass of the first heteroaryl compound is about 6.0 g per dose unit. In some embodiments, the mass of the first heteroaryl compound is about 7.0 g per dose unit. In some embodiments, the mass of the first heteroaryl compound is about 8.0 g per dose unit. In some embodiments, the mass of the first heteroaryl compound is about 9.0 g per dose unit. In some embodiments, the mass of the first heteroaryl compound is about 10.0 g per dose unit.

In some embodiments, the mass of the second heteroaryl compound ranges from about 0.5 g to 10.0 g per dose unit. In some embodiments, the mass of the second heteroaryl compound ranges from about 0.5 g to 8.0 g per dose unit. In some embodiments, the mass of the second heteroaryl compound ranges from about 0.5 g to 6.0 g per dose unit. In some embodiments, the mass of the second heteroaryl compound ranges from about 0.5 g to 5.0 g per dose unit. In some embodiments, the mass of the second heteroaryl compound ranges from about 0.5 g to 4.0 g per dose unit. In some embodiments, the mass of the second heteroaryl compound is about 0.5 g per dose unit. In some embodiments, the mass of the second heteroaryl compound is about 1.0 g per dose unit. In some embodiments, the mass of the second heteroaryl compound is about 1.5 g per dose unit. In some embodiments, the mass of the second heteroaryl compound is about 2.0 g per dose unit. In some embodiments, the mass of the second heteroaryl compound is about 2.5 g per dose unit. In some embodiments, the mass of the second heteroaryl compound is about 3.0 g per dose unit. In some embodiments, the mass of the second heteroaryl compound is about 3.5 g per dose unit. In some embodiments, the mass of the second heteroaryl compound is about 4.0 g per dose unit. In some embodiments, the mass of the second heteroaryl compound is about 4.5 g per dose unit. In some embodiments, the mass of the second heteroaryl compound is about 5.0 g per dose unit. In some embodiments, the mass of the second heteroaryl compound is about 5.5 g per dose unit. In some embodiments, the mass of the second heteroaryl compound is about 6.0 g per dose unit. In some embodiments, the mass of the second heteroaryl compound is about 7.0 g per dose unit. In some embodiments, the mass of the second heteroaryl compound is about 8.0 g per dose unit. In some embodiments, the mass of the second heteroaryl compound is about 9.0 g per dose unit. In some embodiments, the mass of the second heteroaryl compound is about 10.0 g per dose unit.

In some embodiments, the combined mass of the first heteroaryl compound and the second heteroaryl compound ranges from about 1.0 g to about 20.0 g per dose unit. In some embodiments, the combined mass of the first heteroaryl compound and the second heteroaryl compound ranges from about 1.0 g to about 15.0 g per dose unit. In some embodiments, the combined mass of the first heteroaryl compound and the second heteroaryl compound ranges from about 1.0 g to about 12.0 g per dose unit. In some embodiments, the combined mass of the first heteroaryl compound and the second heteroaryl compound ranges from about 1.0 g to about 10.0 g per dose unit. In some embodiments, the combined mass of the first heteroaryl compound and the second heteroaryl compound ranges from about 1.0 g to about 8.0 g per dose unit. In some embodiments, the combined mass of the first heteroaryl compound and the second heteroaryl compound is about 1.0 g per dose unit. In some embodiments, the combined mass of the first heteroaryl compound and the second heteroaryl compound is about 2.0 g per dose unit. In some embodiments, the combined mass of the first heteroaryl compound and the second heteroaryl compound is about 4.0 g per dose unit. In some embodiments, the combined mass of the first heteroaryl compound and the second heteroaryl compound is about 6.0 g per dose unit. In some embodiments, the combined mass of the first heteroaryl compound and the second heteroaryl compound is about 8.0 g per dose unit. In some embodiments, the combined mass of the first heteroaryl compound and the second heteroaryl compound is about 10.0 g per dose unit. In some embodiments, the combined mass of the first heteroaryl compound and the second heteroaryl compound is about 12.0 g per dose unit.

In some embodiments, the first heteroaryl compound is thymidine and the second heteroaryl compound is deoxycytidine.

In some embodiments, the thymidine is at a concentration of about 20 mg/mL or more. In some embodiments, the thymidine is at a concentration ranging from about 20 mg/mL to about 100 mg/mL. In some embodiments, the thymidine is at a concentration ranging from about 20 mg/mL to about 90 mg/mL. In some embodiments, the thymidine is at a concentration ranging from about 30 mg/mL to about 90 mg/mL. In some embodiments, the thymidine is at a concentration ranging from about 50 mg/mL to about 90 mg/mL. In some embodiments, the thymidine is at a concentration ranging from about 60 mg/mL to about 90 mg/mL. In some embodiments, the thymidine is at a concentration ranging from about 40 mg/mL to about 60 mg/mL. In some embodiments, the thymidine is at a concentration of about 20 mg/mL. In some embodiments, the thymidine is at a concentration of about 30 mg/mL. In some embodiments, the thymidine is at a concentration of about 40 mg/mL. In some embodiments, the thymidine is at a concentration of about 50 mg/mL. In some embodiments, the thymidine is at a concentration of about 60 mg/mL. In some embodiments, the thymidine is at a concentration of about 70 mg/mL. In some embodiments, the thymidine is at a concentration of about 80 mg/mL. In some embodiments, the thymidine is at a concentration of about 90 mg/mL. In some embodiments, the thymidine is at a concentration of about 100 mg/mL. In some embodiments, the present compositions can include dissolved thymidine at a concentration of 10 mg/mL or more, such as 20 mg/mL or more, 30 mg/mL or more, 40 mg/mL or more, 50 mg/mL or more, 60 mg/mL or more, 70 mg/mL or more, 80 mg/mL or more, or 90 mg/mL or more. For instance, in some embodiments, the concentration of dissolved thymidine can range from 30 mg/mL to 90 mg/mL, such as from 30 mg/mL to 75 mg/mL, or from 40 mg/mL to 60 mg/mL.

In some embodiments, the deoxycytidine is at a concentration of about 20 mg/mL or more. In some embodiments, the deoxycytidine is at a concentration ranging from about 20 mg/mL to about 100 mg/mL. In some embodiments, the deoxycytidine is at a concentration ranging from about 30 mg/mL to about 90 mg/mL. In some embodiments, the deoxycytidine is at a concentration ranging from about 40 mg/mL to about 90 mg/mL. In some embodiments, the deoxycytidine is at a concentration ranging from about 50 mg/mL to about 90 mg/mL. In some embodiments, the deoxycytidine is at a concentration ranging from about 40 mg/mL to about 60 mg/mL. In some embodiments, the deoxycytidine is at a concentration of about 20 mg/mL. In some embodiments, the deoxycytidine is at a concentration of about 30 mg/mL. In some embodiments, the deoxycytidine is at a concentration of about 40 mg/mL. In some embodiments, the deoxycytidine is at a concentration of about 50 mg/mL. In some embodiments, the deoxycytidine is at a concentration of about 60 mg/mL. In some embodiments, the deoxycytidine is at a concentration of about 70 mg/mL. In some embodiments, the deoxycytidine is at a concentration of about 80 mg/mL. In some embodiments, the deoxycytidine is at a concentration of about 90 mg/mL. In some embodiments, the deoxycytidine is at a concentration of about 100 mg/mL.

In some embodiments, the present compositions can include dissolved deoxycytidine at a concentration of 10 mg/mL or more, such as 20 mg/mL or more, 30 mg/mL or more, 40 mg/mL or more, 50 mg/mL or more, or 60 mg/mL or more. For instance, in some embodiments, the concentration of dissolved deoxycytidine can range from 30 mg/mL to 75 mg/mL, such as from 40 mg/mL to 60 mg/mL.

In some embodiments, the compositions can contain relatively high concentrations of deoxycytidine and thymidine, e.g. so that a certain mass of each nucleoside can be orally administered to a patient with a relatively low volume of solution. Stated in another manner, in some cases a medical condition of the patient can increase the difficulty of orally administering a solution to the patient. For instance, it can be difficulty for the patient to swallow. In some cases the patient is administered liquids, foods, or a combination thereof through a tube due to the difficulty of swallowing. Exemplary tubes include gastrostomy tubes and nasogastric tubes. As such, it can be advantageous to reduce the volume of liquid administered to the patient while still providing the desired amounts of thymidine and deoxycytidine. In some embodiments, the present compositions can have relatively high concentrations of these nucleosides, thereby allowing administration of a particular amount of each nucleoside with a lower volume of liquid.

The presence of the deoxycytidine can increase the solubility of the thymidine in the aqueous liquid. Stated in another manner, in some embodiments, the solubility of thymidine in an aqueous liquid can be higher by 10% or more compared with an otherwise identical aqueous liquid that lacked deoxycytidine, such by 25% or more, 50% or more, or 75% or more. In some embodiments, the solubility of thymidine can be higher by 10 mg/mL or more compared with an otherwise identical aqueous liquid that lacked deoxycytidine, such as by 20 mg/mL or more.

In some embodiments the volume of aqueous liquid ranges from 1 mL to 1,000 mL, such as from 10 mL to 750 mL, from 15 mL to 500 mL, from 20 mL to 400 mL, or from 30 mL to 300 mL. In some embodiments, the mass of thymidine in the solution can range from 0.1 g to 10 g per dose unit, such as from 0.2 g to 8 g per dose unit, or from 0.5 g to 4 g per dose unit. The mass of deoxycytidine in the solution can range from 0.1 g to 10 g per dose unit, such as from 0.2 g to 8 g per dose unit, or from 0.5 g to 4 g per dose unit. In some embodiments the mass of deoxycytidine ranges from 50% to 200% of the mass of thymidine, such as from 60% to 175%, from 70% to 150%, from 80% to 125%, from 90% to 110%, and from 95% to 105%.

In some embodiments, the mass of thymidine ranges from about 0.5 g to 10.0 g per dose unit. In some embodiments, the mass of thymidine ranges from about 0.5 g to 8.0 g per dose unit. In some embodiments, the mass of thymidine ranges from about 0.5 g to 6.0 g per dose unit. In some embodiments, the mass of thymidine ranges from about 0.5 g to 5.0 g per dose unit. In some embodiments, the mass of thymidine ranges from about 0.5 g to 4.0 g per dose unit. In some embodiments, the mass of thymidine is about 0.5 g per dose unit. In some embodiments, the mass of thymidine is about 1.0 g per dose unit. In some embodiments, the mass of thymidine is about 1.5 g per dose unit. In some embodiments, the mass of thymidine is about 2.0 g per dose unit. In some embodiments, the mass of thymidine is about 2.5 g per dose unit. In some embodiments, the mass of thymidine is about 3.0 g per dose unit. In some embodiments, the mass of thymidine is about 3.5 g per dose unit. In some embodiments, the mass of thymidine is about 4.0 g per dose unit. In some embodiments, the mass of thymidine is about 4.5 g per dose unit. In some embodiments, the mass of thymidine is about 5.0 g per dose unit. In some embodiments, the mass of thymidine is about 5.5 g per dose unit. In some embodiments, the mass of thymidine is about 6.0 g per dose unit. In some embodiments, the mass of thymidine is about 7.0 g per dose unit. In some embodiments, the mass of thymidine is about 8.0 g per dose unit. In some embodiments, the mass of thymidine is about 9.0 g per dose unit. In some embodiments, the mass of thymidine is about 10.0 g per dose unit.

In some embodiments, the mass of deoxycytidine ranges from about 0.5 g to 10.0 g per dose unit. In some embodiments, the mass of deoxycytidine ranges from about 0.5 g to 8.0 g per dose unit. In some embodiments, the mass of deoxycytidine ranges from about 0.5 g to 6.0 g per dose unit. In some embodiments, the mass of deoxycytidine ranges from about 0.5 g to 5.0 g per dose unit. In some embodiments, the mass of deoxycytidine ranges from about 0.5 g to 4.0 g per dose unit. In some embodiments, the mass of deoxycytidine is about 0.5 g per dose unit. In some embodiments, the mass of deoxycytidine is about 1.0 g per dose unit. In some embodiments, the mass of deoxycytidine is about 1.5 g per dose unit. In some embodiments, the mass of deoxycytidine is about 2.0 g per dose unit. In some embodiments, the mass of deoxycytidine is about 2.5 g per dose unit. In some embodiments, the mass of deoxycytidine is about 3.0 g per dose unit. In some embodiments, the mass of deoxycytidine is about 3.5 g per dose unit. In some embodiments, the mass of deoxycytidine is about 4.0 g per dose unit. In some embodiments, the mass of deoxycytidine is about 4.5 g per dose unit. In some embodiments, the mass of deoxycytidine is about 5.0 g per dose unit. In some embodiments, the mass of deoxycytidine is about 5.5 g per dose unit. In some embodiments, the mass of deoxycytidine is about 6.0 g per dose unit. In some embodiments, the mass of deoxycytidine is about 7.0 g per dose unit. In some embodiments, the mass of deoxycytidine is about 8.0 g per dose unit. In some embodiments, the mass of deoxycytidine is about 9.0 g per dose unit. In some embodiments, the mass of deoxycytidine is about 10.0 g per dose unit.

In some embodiments, the combined mass of thymidine and deoxycytidine ranges from about 1.0 g to about 20.0 g per dose unit. In some embodiments, the combined mass of thymidine and deoxycytidine ranges from about 1.0 g to about 15.0 g per dose unit. In some embodiments, the combined mass of thymidine and deoxycytidine ranges from about 1.0 g to about 12.0 g per dose unit. In some embodiments, the combined mass of thymidine and deoxycytidine ranges from about 1.0 g to about 10.0 g per dose unit. In some embodiments, the combined mass of thymidine and deoxycytidine ranges from about 1.0 g to about 8.0 g per dose unit. In some embodiments, the combined mass of thymidine and deoxycytidine is about 1.0 g per dose unit. In some embodiments, the combined mass of thymidine and deoxycytidine is about 2.0 g per dose unit. In some embodiments, the combined mass of thymidine and deoxycytidine is about 4.0 g per dose unit. In some embodiments, the combined mass of thymidine and deoxycytidine is about 6.0 g per dose unit. In some embodiments, the combined mass of thymidine and deoxycytidine is about 8.0 g per dose unit. In some embodiments, the combined mass of thymidine and deoxycytidine is about 10.0 g per dose unit. In some embodiments, the combined mass of thymidine and deoxycytidine is about 12.0 g per dose unit.

In some embodiments, the mass of deoxycytidine ranges from about 20% to about 120% of the mass of thymidine. In some embodiments, the mass of deoxycytidine ranges from about 30% to about 110% of the mass of thymidine. In some embodiments, the mass of deoxycytidine ranges from about 40% to about 110% of the mass of thymidine. In some embodiments, the mass of deoxycytidine ranges from about 40% to about 100% of the mass of thymidine. In some embodiments, the mass of deoxycytidine ranges from about 70% to about 120% of the mass of thymidine. In some embodiments, the mass of deoxycytidine ranges from about 80% to about 120% of the mass of thymidine. In some embodiments, the mass of deoxycytidine ranges from about 90% to about 110% of the mass of thymidine. In some embodiments, the mass of deoxycytidine is about 20% of the mass of thymidine. In some embodiments, the mass of deoxycytidine is about 30% of the mass of thymidine. In some embodiments, the mass of deoxycytidine is about 40% of the mass of thymidine. In some embodiments, the mass of deoxycytidine is about 50% of the mass of thymidine. In some embodiments, the mass of deoxycytidine is about 60% of the mass of thymidine. In some embodiments, the mass of deoxycytidine is about 70% of the mass of thymidine. In some embodiments, the mass of deoxycytidine is about 80% of the mass of thymidine. In some embodiments, the mass of deoxycytidine is about 90% of the mass of thymidine. In some embodiments, the mass of deoxycytidine is about 100% of the mass of thymidine. In some embodiments, the mass of deoxycytidine is about 110% of the mass of thymidine. In some embodiments, the mass of deoxycytidine is about 120% of the mass of thymidine.

In some embodiments, the first heteroaryl compound and the second heteroaryl compound are selected from derivatives of nucleosides and derivatives of deoxynucleosides. In some embodiments, the first heteroaryl compound and the second heteroaryl compound are selected from prodrugs of nucleosides and deoxynucleosides.

In some embodiments, the first heteroaryl compound is a derivative of deoxyguanosine and the second heteroaryl compound is a derivative of deoxyadenosine. In some embodiments, the first heteroaryl compound is a prodrug of deoxyguanosine and the second heteroaryl compound is a prodrug of deoxyadenosine.

In some embodiments, the derivatives of nucleosides and the derivatives of deoxynucleosides include nucleosides and deoxynucleosides that are substituted at one or more positions on the sugar moiety of the nucleosides and deoxynucleosides. In some embodiments, the substitution on the sugar moiety includes substitution on the hydroxy groups of the sugar moiety. In some embodiments, the substitution includes, but is not limited to, acyl groups and alkyl groups on the hydroxy groups of the sugar moiety. In some embodiments, the derivatives of nucleosides and the derivatives of deoxynucleosides are substituted with one or more acyl groups. In some embodiments, the derivatives of nucleosides and the derivatives of deoxynucleosides are substituted with one or more amino acids. In some embodiments, the derivatives of nucleosides and the derivatives of deoxynucleosides are substituted with one or more amino acids and one or more acyl groups.

In some embodiments, the derivatives or prodrugs can be prepared using protection/deprotection strategies known in the art for nucleosides, deoxynucleosides, and derivatives thereof.

In some embodiments, the first heteroaryl compound and the second heteroaryl compound are selected from:

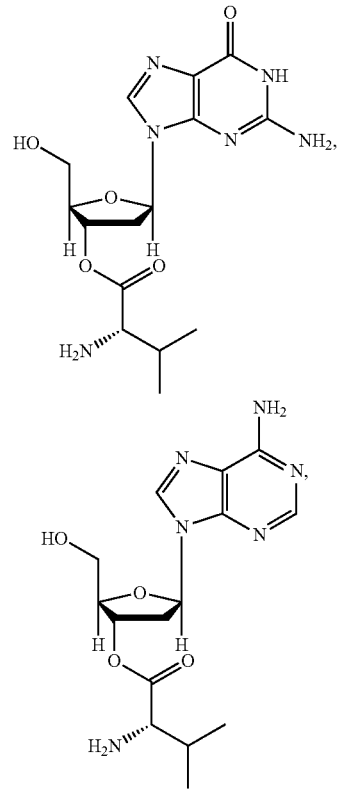

-continued

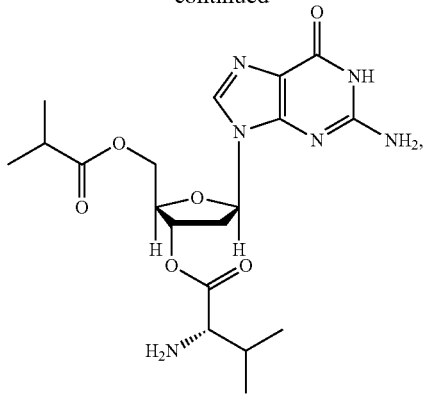

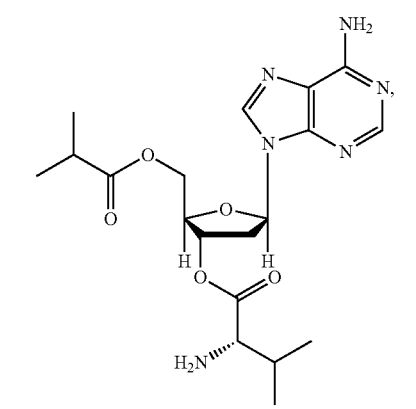

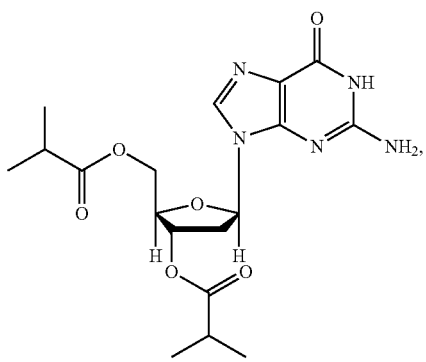

In some embodiments, the first heteroaryl compound is Compound G

Compound G

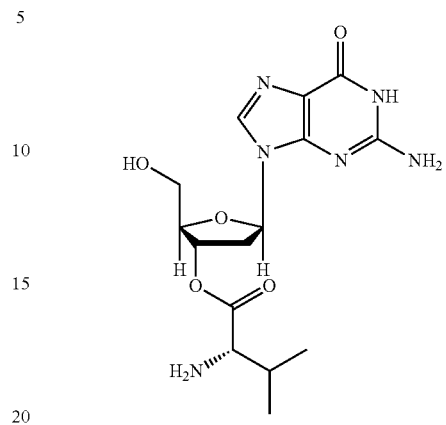

and the second heteroaryl compound is Compound A

Compound A

In some embodiments, Compound G is at a concentration of about 20 mg/mL or more. In some embodiments, Compound G is at a concentration ranging from about 20 mg/mL to about 100 mg/mL. In some embodiments, Compound G is at a concentration ranging from about 40 mg/mL to about 100 mg/mL. In some embodiments, Compound G is at a concentration ranging from about 50 mg/mL to about 100 mg/mL. In some embodiments, Compound G is at a concentration ranging from about 60 mg/mL to about 100 mg/mL. In some embodiments, Compound G is at a concentration ranging from about 60 mg/mL to about 90 mg/mL. In some embodiments, Compound G is at a concentration of about 20 mg/mL. In some embodiments, Compound G is at a concentration of about 30 mg/mL. In some embodiments, Compound G is at a concentration of about 40 mg/mL. In some embodiments, Compound G is at a concentration of about 50 mg/mL. In some embodiments, Compound G is at a concentration of about 60 mg/mL. In some embodiments, Compound G is at a concentration of about 70 mg/mL. In some embodiments, Compound G is at a concentration of about 80 mg/mL. In some embodiments, Compound G is at a concentration of about 90 mg/mL. In some embodiments, Compound G is at a concentration of about 100 mg/mL.

In some embodiments, Compound A is at a concentration ranging from about 1 mg/mL to about 100 mg/mL. In some embodiments, Compound A is at a concentration ranging from about 5 mg/mL to about 100 mg/mL. In some embodiments, Compound A is at a concentration ranging from about 5 mg/mL to about 90 mg/mL. In some embodiments, Compound A is at a concentration ranging from about 5 mg/mL to about 80 mg/mL. In some embodiments, Compound A is at a concentration ranging from about 5 mg/mL to about 70 mg/mL. In some embodiments, Compound A is at a concentration ranging from about 5 mg/mL to about 60 mg/mL. In some embodiments, Compound A is at a concentration of about 5 mg/mL. In some embodiments, Compound A is at a concentration of about 10 mg/mL. In some embodiments, Compound A is at a concentration of about 20 mg/mL. In some embodiments, Compound A is at a concentration of about 30 mg/mL. In some embodiments, Compound A is at a concentration of about 40 mg/mL. In some embodiments, Compound A is at a concentration of about 50 mg/mL. In some embodiments, Compound A is at a concentration of about 60 mg/mL. In some embodiments, Compound A is at a concentration of about 70 mg/mL. In some embodiments, Compound A is at a concentration of about 80 mg/mL. In some embodiments, Compound A is at a concentration of about 90 mg/mL. In some embodiments, Compound A is at a concentration of about 100 mg/mL.

In some embodiments, the molar ratio of Compound G to Compound A is from about 1:0.1 to about 1:1.2. In some embodiments, the molar ratio of Compound G to Compound A is from about 1:0.1 to about 1:1. In some embodiments, the molar ratio of Compound G to Compound A is from about 1:0.25 to about 1:1. In some embodiments, the molar ratio of Compound G to Compound A is from about 1:0.5 to about 1:1. In some embodiments, the molar ratio of Compound G to Compound A is from about 1:0.75 to about 1:1. In some embodiments, the molar ratio of Compound G to Compound A is about 1:0.1. In some embodiments, the molar ratio of Compound G to Compound A is about 1:0.2. In some embodiments, the molar ratio of Compound G to Compound A is about 1:0.25. In some embodiments, the molar ratio of Compound G to Compound A is about 1:0.3. In some embodiments, the molar ratio of Compound G to Compound A is about 1:0.4. In some embodiments, the molar ratio of Compound G to Compound A is about 1:0.5. In some embodiments, the molar ratio of Compound G to Compound A is about 1:0.6. In some embodiments, the molar ratio of Compound G to Compound A is about 1:0.7. In some embodiments, the molar ratio of Compound G to Compound A is about 1:0.75. In some embodiments, the molar ratio of Compound G to Compound A is about 1:0.8. In some embodiments, the molar ratio of Compound G to Compound A is about 1:0.9. In some embodiments, the molar ratio of Compound G to Compound A is about 1:1. In some embodiments, the molar ratio of Compound G to Compound A is about 1:1.1. In some embodiments, the molar ratio of Compound G to Compound A is about 1:1.2.

In some embodiments, the mass of Compound G ranges from about 0.5 g to 10.0 g per dose unit. In some embodiments, the mass of Compound G ranges from about 0.5 g to 8.0 g per dose unit. In some embodiments, the mass of Compound G ranges from about 0.5 g to 6.0 g per dose unit. In some embodiments, the mass of Compound G ranges from about 0.5 g to 5.0 g per dose unit. In some embodiments, the mass of Compound G ranges from about 0.5 g to 4.0 g per dose unit. In some embodiments, the mass of Compound G is about 0.5 g per dose unit. In some embodiments, the mass of Compound G is about 1.0 g per dose unit. In some embodiments, the mass of Compound G is about 1.5 g per dose unit. In some embodiments, the mass of Compound G is about 2.0 g per dose unit. In some embodiments, the mass of Compound G is about 2.5 g per dose unit. In some embodiments, the mass of Compound G is about 3.0 g per dose unit. In some embodiments, the mass of Compound G is about 3.5 g per dose unit. In some embodiments, the mass of Compound G is about 4.0 g per dose unit. In some embodiments, the mass of Compound G is about 4.5 g per dose unit. In some embodiments, the mass of Compound G is about 5.0 g per dose unit. In some embodiments, the mass of Compound G is about 5.5 g per dose unit. In some embodiments, the mass of Compound G is about 6.0 g per dose unit. In some embodiments, the mass of Compound G is about 7.0 g per dose unit. In some embodiments, the mass of Compound G is about 8.0 g per dose unit. In some embodiments, the mass of Compound G is about 9.0 g per dose unit. In some embodiments, the mass of Compound G is about 10.0 g per dose unit.

In some embodiments, the mass of Compound A ranges from about 0.5 g to 10.0 g per dose unit. In some embodiments, the mass of Compound A ranges from about 0.5 g to 8.0 g per dose unit. In some embodiments, the mass of Compound A ranges from about 0.5 g to 6.0 g per dose unit. In some embodiments, the mass of Compound A ranges from about 0.5 g to 5.0 g per dose unit. In some embodiments, the mass of Compound A ranges from about 0.5 g to 4.0 g per dose unit. In some embodiments, the mass of Compound A is about 0.5 g per dose unit. In some embodiments, the mass of Compound A is about 1.0 g per dose unit. In some embodiments, the mass of Compound A is about 1.5 g per dose unit. In some embodiments, the mass of Compound A is about 2.0 g per dose unit. In some embodiments, the mass of Compound A is about 2.5 g per dose unit. In some embodiments, the mass of Compound A is about 3.0 g per dose unit. In some embodiments, the mass of Compound A is about 3.5 g per dose unit. In some embodiments, the mass of Compound A is about 4.0 g per dose unit. In some embodiments, the mass of Compound A is about 4.5 g per dose unit. In some embodiments, the mass of Compound A is about 5.0 g per dose unit. In some embodiments, the mass of Compound A is about 5.5 g per dose unit. In some embodiments, the mass of Compound A is about 6.0 g per dose unit. In some embodiments, the mass of Compound A is about 7.0 g per dose unit. In some embodiments, the mass of Compound A is about 8.0 g per dose unit. In some embodiments, the mass of Compound A is about 9.0 g per dose unit. In some embodiments, the mass of Compound v is about 10.0 g per dose unit.

In some embodiments, the combined mass of Compound G and Compound A ranges from about 1.0 g to about 20.0 g per dose unit. In some embodiments, the combined mass of Compound G and Compound A ranges from about 1.0 g to about 15.0 g per dose unit. In some embodiments, the combined mass of Compound G and Compound A ranges from about 1.0 g to about 12.0 g per dose unit. In some embodiments, the combined mass of Compound G and Compound A ranges from about 1.0 g to about 10.0 g per dose unit. In some embodiments, the combined mass of Compound G and Compound A ranges from about 1.0 g to about 8.0 g per dose unit. In some embodiments, the combined mass of Compound G and Compound A is about 1.0 g per dose unit. In some embodiments, the combined mass of Compound G and Compound A is about 2.0 g per dose unit. In some embodiments, the combined mass of Compound G and Compound A is about 4.0 g per dose unit. In some embodiments, the combined mass of Compound G and Compound A is about 6.0 g per dose unit. In some embodiments, the combined mass of Compound G and Compound A is about 8.0 g per dose unit. In some embodiments, the combined mass of Compound G and Compound A is about 10.0 g per dose unit. In some embodiments, the combined mass of Compound G and Compound A is about 12.0 g per dose unit.

In some embodiments, the mass of Compound A ranges from about 20% to about 120% of the mass of Compound G. In some embodiments, the mass of Compound A ranges from about 30% to about 110% of the mass of Compound G. In some embodiments, the mass of Compound A ranges from about 40% to about 110% of the mass of Compound G. In some embodiments, the mass of Compound A ranges from about 40% to about 100% of the mass of Compound G. In some embodiments, the mass of Compound A ranges from about 70% to about 120% of the mass of Compound G. In some embodiments, the mass of Compound A ranges from about 80% to about 120% of the mass of Compound G. In some embodiments, the mass of Compound A ranges from about 90% to about 110% of the mass of Compound G. In some embodiments, the mass of Compound A is about 20% of the mass of Compound G. In some embodiments, the mass of Compound A is about 30% of the mass of Compound G. In some embodiments, the mass of Compound A is about 40% of the mass of Compound G. In some embodiments, the mass of Compound A is about 50% of the mass of Compound G. In some embodiments, the mass of Compound A is about 60% of the mass of Compound G. In some embodiments, the mass of Compound A is about 70% of the mass of Compound G. In some embodiments, the mass of Compound A is about 80% of the mass of Compound G. In some embodiments, the mass of Compound A is about 90% of the mass of Compound G. In some embodiments, the mass of Compound A is about 100% of the mass of Compound G. In some embodiments, the mass of Compound A is about 110% of the mass of Compound G. In some embodiments, the mass of Compound A is about 120% of the mass of Compound G.

In some embodiments, provided is a composition as disclosed herein for use in treatment of a patient with a mutation in the TK2 gene resulting in mitochondrial depletion. In some embodiments, the composition comprises a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound, and wherein the first heteroaryl compound and the second heteroaryl compound are selected from optionally substituted pyrimidines and optionally substituted purines.

In some embodiments, provided is a method of treating a patient with a mutation in the TK2 gene resulting in mitochondrial depletion comprising administering a composition as disclosed herein. In some embodiments, provided is a method of treating a patient with a mutation in the TK2 gene resulting in mitochondrial depletion comprising administering a composition comprising a first heteroaryl compound and a second heteroaryl compound dissolved in an aqueous liquid, wherein the concentration of the first heteroaryl compound is higher relative to a composition comprising the first heteroaryl compound dissolved in an aqueous liquid without the second heteroaryl compound, and wherein the first heteroaryl compound and the second heteroaryl compound are selected from optionally substituted pyrimidines and optionally substituted purines.

Methods

In some embodiments, the present disclosure provides a method for preparing the compositions as disclosed herein.

In some embodiments, the present disclosure provides a method comprising dissolving a first heteroaryl compound and a second heteroaryl compound in an aqueous liquid to form a solution, wherein the concentration of the first heteroaryl compound is higher relative to a composition comprising the first heteroaryl compound dissolved in an aqueous liquid without the second heteroaryl compound. In some embodiments, the first heteroaryl compound and the second heteroaryl compound are selected from optionally substituted pyrimidines and optionally substituted purines.

In some embodiments, the dissolving is performed for about 10 minutes or less. In some embodiments, the dissolving is performed for about 9 minutes or less. In some embodiments, the dissolving is performed for about 8 minutes or less. In some embodiments, the dissolving is performed for about 7 minutes or less. In some embodiments, the dissolving is performed for about 6 minutes or less. In some embodiments, the dissolving is performed for about 5 minutes or less. In some embodiments, the dissolving is performed for about 4 minutes or less. In some embodiments, the dissolving is performed for about 3 minutes or less. In some embodiments, the dissolving is performed for about 2 minutes or less. In some embodiments, the dissolving is performed for about 1 minute or less.

In some embodiments, the dissolving is performed by mixing the first heteroaryl compound and the second heteroaryl compound in a mixer. In some embodiments, the mixer includes, but is not limited to, a stir bar in a mixing vessel. In some embodiments, the dissolving is performed by mixing the first heteroaryl compound and the second heteroaryl compound at from about 50 rpm to about 1000 rpm. In some embodiments, the dissolving is performed by mixing the first heteroaryl compound and the second heteroaryl compound at from about 100 rpm to about 800 rpm. In some embodiments, the dissolving is performed by mixing the first heteroaryl compound and the second heteroaryl compound at from about 150 rpm to about 650 rpm. In some embodiments, the dissolving is performed by mixing the first heteroaryl compound and the second heteroaryl compound at about 50 rpm. In some embodiments, the dissolving is performed by mixing the first heteroaryl compound and the second heteroaryl compound at about 100 rpm. In some embodiments, the dissolving is performed by mixing the first heteroaryl compound and the second heteroaryl compound at about 150 rpm. In some embodiments, the dissolving is performed by mixing the first heteroaryl compound and the second heteroaryl compound at about 200 rpm. In some embodiments, the dissolving is performed by mixing the first heteroaryl compound and the second heteroaryl compound at about 300 rpm. In some embodiments, the dissolving is performed by mixing the first heteroaryl compound and the second heteroaryl compound at about 400 rpm. In some embodiments, the dissolving is performed by mixing the first heteroaryl compound and the second heteroaryl compound at about 500 rpm. In some embodiments, the dissolving is performed by mixing the first heteroaryl compound and the second heteroaryl compound at about 600 rpm. In some embodiments, the dissolving is performed by mixing the first heteroaryl compound and the second heteroaryl compound at about 650 rpm. In some embodiments, the dissolving is performed by mixing the first heteroaryl compound and the second heteroaryl compound at about 700 rpm. In some embodiments, the dissolving is performed by mixing the first heteroaryl compound and the second heteroaryl compound at about 800 rpm. In some embodiments, the dissolving is performed by mixing the first heteroaryl compound and the second heteroaryl compound at about 900 rpm. In some embodiments, the dissolving is performed by mixing the first heteroaryl compound and the second heteroaryl compound at about 1000 rpm.

In some embodiments, the dissolving is performed by mixing the first heteroaryl compound and the second heteroaryl compound at from about 50 rpm to about 1000 rpm for 10 minutes or less. In some embodiments, the dissolving is performed by mixing the first heteroaryl compound and the second heteroaryl compound at from about 50 rpm to about 1000 rpm for 7 minutes or less. In some embodiments, the dissolving is performed by mixing the first heteroaryl compound and the second heteroaryl compound at from about 50 rpm to about 1000 rpm for 5 minutes or less. In some embodiments, the dissolving is performed by mixing the first heteroaryl compound and the second heteroaryl compound at from about 50 rpm to about 1000 rpm for 3 minutes or less. In some embodiments, the dissolving is performed by mixing the first heteroaryl compound and the second heteroaryl compound at from about 50 rpm to about 1000 rpm for 2 minutes or less.

In some embodiments, the dissolving is performed by mixing the first heteroaryl compound and the second heteroaryl compound at from about 150 rpm to about 650 rpm for 10 minutes or less. In some embodiments, the dissolving is performed by mixing the first heteroaryl compound and the second heteroaryl compound at from about 150 rpm to about 650 rpm for 5 minutes or less. In some embodiments, the dissolving is performed by mixing the first heteroaryl compound and the second heteroaryl compound at from about 150 rpm to about 650 rpm for 3 minutes or less. In some embodiments, the dissolving is performed by mixing the first heteroaryl compound and the second heteroaryl compound at from about 150 rpm to about 650 rpm for 2 minutes or less.

In some embodiments, the dissolving is performed by mixing the first heteroaryl compound and the second heteroaryl compound at about 650 rpm for about 1 minute followed by mixing the first heteroaryl compound and the second heteroaryl compound at about 150 rpm for about 1 minute.

In some embodiments, the dissolving is performed by mixing the first heteroaryl compound and the second heteroaryl compound in a specific volume of an aqueous liquid to form a mixture, and then shaking the mixture and/or inverting the mixture to dissolve the second heteroaryl compound and/or the first heteroaryl compound.

In some embodiments, at least 80% of the first heteroaryl compound and at least 80% of the second heteroaryl compound are dissolved. In some embodiments, at least 85% of the first heteroaryl compound and at least 85% of the second heteroaryl compound are dissolved. In some embodiments, at least 90% of the first heteroaryl compound and at least 90% of the second heteroaryl compound are dissolved. In some embodiments, at least 95% of the first heteroaryl compound and at least 95% of the second heteroaryl compound are dissolved. In some embodiments, 100% of the first heteroaryl compound and 100% of the second heteroaryl compound are dissolved. In some embodiments, at least 90%, or at least 91%, or at least 92%, or at least 93%, or at least 94%, or at least 95%, or at least 96%, or at least 97%, or at least 98%, or at least 99% of the first heteroaryl compound is dissolved. In some embodiments, at least 90%, or at least 91%, or at least 92%, or at least 93%, or at least 94%, or at least 95%, or at least 96%, or at least 97%, or at least 98%, or at least 99% of the second heteroaryl compound is dissolved.

In some embodiments, the dissolving is performed for about 5 minutes or less and at least 95% of the first heteroaryl compound and at least 95% of the second heteroaryl compound are dissolved. In some embodiments, the dissolving is performed for about 2 minutes or less and at least about 95% of the first heteroaryl compound and at least about 95% of the second heteroaryl compound are dissolved.

In some embodiments, the first heteroaryl compound is thymidine and the second heteroaryl compound is deoxycytidine.

In some embodiments, the first heteroaryl compound is Compound G

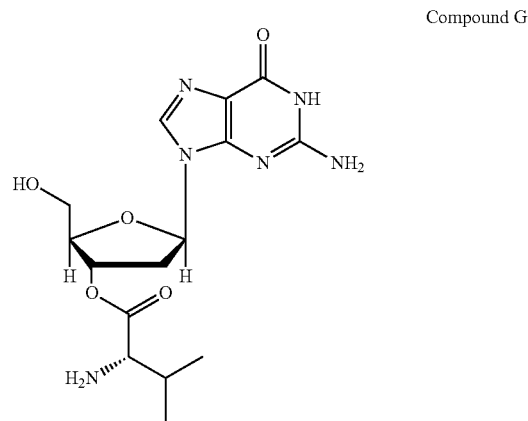 [SMILES: CC(C)[C@H](N)C(=O)O[C@@H]1C[C@H](n2cnc3c(=O)[nH]c(N)nc32)O[C@@H]1CO]

Compound G and the second heteroaryl compound is Compound A

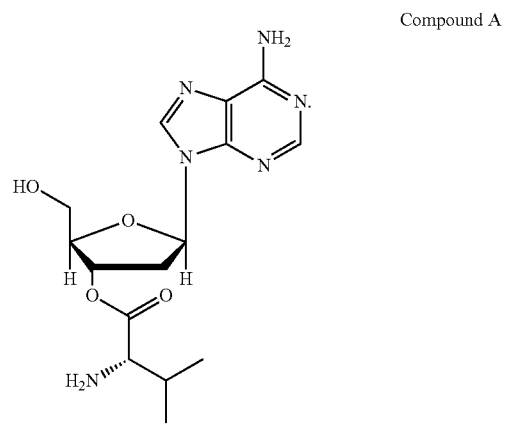 [SMILES: CC(C)[C@H](N)C(=O)O[C@@H]1C[C@H](n2cnc3c(N)ncnc32)O[C@@H]1CO]

Compound A

In some embodiments, the present disclosure provides methods that include dissolving the first heteroaryl compound and the second heteroaryl compound (e.g., thymidine and deoxycytidine) in an aqueous liquid to form a solution. For instance, in some embodiments, the first heteroaryl compound and the second heteroaryl compound (e.g., powdered thymidine and powdered deoxycytidine) can be poured into the aqueous liquid and agitated, e.g. stirred, until the compounds (e.g., nucleosides) have dissolved. In some embodiments, the dissolving is performed for 10 minutes or less, e.g. for 5 minutes or less, or 1 minute or less. In some embodiments, all of the nucleosides have dissolved. In some embodiments, most of the compounds (e.g., nucleosides) have dissolved, e.g. at least 90%, at least 95%, or at least 99% of each compound (e.g., nucleoside) has dissolved. In some embodiments, the dissolving step can form any of the compositions described above. For instance, in some embodiments, the dissolving step be performed for 5 minutes or less and can generate a solution comprising 20 mg/mL or more, such as from 40 mg/mL to 60 mL, each of dissolved first heteroaryl compound and the second heteroaryl compound (e.g., thymidine and deoxycytidine).

Figure 2:
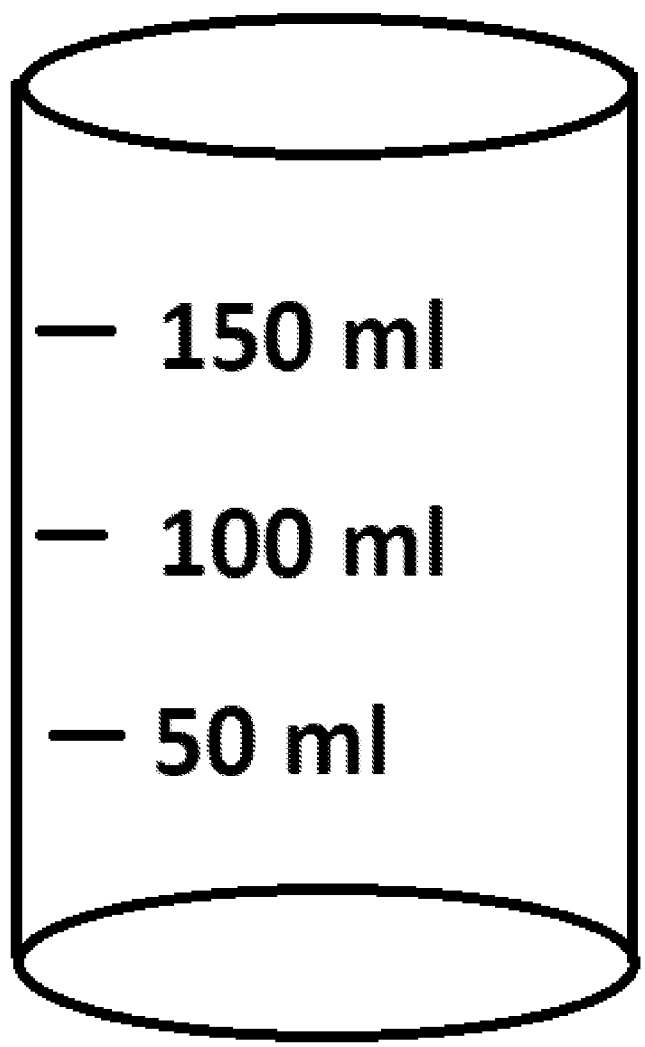
FIG. 2 shows an exemplary container having marks indicating the vertical height corresponding to a certain volume of water.

In some embodiments, the aqueous liquid is located in a container comprising a mark corresponding to a specific volume during the dissolving. For instance, in some embodiments, the mark can include a volumetric unit, e.g. milliliters, cups, fluid ounces, tablespoons, teaspoons, or drams. Stated in another manner, in some embodiments, the mark can correspond to specific volume. For instance, FIG. 2 shows an exemplary container having three markings labeled with a specific volume, i.e. 50 mL, 100 mL, and 150 mL. In some embodiments, the container can have three markings labeled with different specific volumes, including, but not limited to, 40 mL, 80 mL, and 120 mL. The markings on the container can include any increment that corresponds with volume relevant to the preparation of the composition or product. In some embodiments, the mark can indicate how many packages of the first heteroaryl compound and the second heteroaryl compound (e.g., deoxycytidine and thymidine) to use in the dissolving step. For instance, FIG. 1 shows an exemplary container having three marks, wherein each mark has a line indicating the height of the liquid, a symbol corresponding to a package, and a number associated with the number of packages. The FIG. 1 symbol represents a paper or foil package that has been torn near its top, e.g. along a perforation. For example, a user can empty the desired number of packages of compounds (e.g., nucleosides) into the container and then add a volume of liquid to the indicated height mark.

In some embodiments, each package can contain one of the compounds (e.g., nucleosides) or both of the compounds (e.g., nucleosides). For instance, in some embodiments, a package can contain both the first heteroaryl compound and the second heteroaryl compound (e.g., deoxycytidine and thymidine). In some cases at least one package contains the second heteroaryl compound (e.g., deoxycytidine) but not the first heteroaryl compound (e.g. thymidine), or the first heteroaryl compound (e.g. thymidine) but not the second heteroaryl compound (e.g., deoxycytidine). The method can include adding the contents of 1 or more packages into the container, e.g. 2 or more, 3 or more, 4 or more, or 5 or more. In some cases the mass of compound (e.g., nucleoside) per package ranges from 0.1 g to 10 g, such as from 0.5 g to 4.0 g.

The method can also include orally administering the solution comprising the compounds (e.g., nucleosides) to a patient. For instance, the solution can be administered using a syringe, e.g. a syringe configured to contain from 1 mL to 150 mL of liquid, such as from 25 mL to 100 mL. The solution can be orally administered through a nasogastric tube or a gastrostomy tube, e.g. using the syringe. In some cases the oral administration is performed once a day, twice a day, three times a day, or four or more times a day. The administration can be repeated for 10 or more days, such as 30 or more days or 90 or more days.

In some embodiments the subject has been diagnosed with a mitochondrial DNA depletion syndrome, a deficiency in producing thymidine, a deficiency in producing deoxycytidine, a mutation in the TK2 gene, or a combination thereof. In such cases the administration of deoxycytidine and thymidine can sometimes improve the health of the subject. For instance, in some cases the subject will increase in weight, e.g. increase in weight at a faster rate than before the administration of the solution. These increases in health, e.g. as evidenced by increased weight gain, might be first noticed after an extended administration of the solutions, e.g. for 10 days or more.

Kits

In some embodiments, also provided are kits that can be used to create the compositions and perform the methods described above.

In some embodiments, the kits can include the second heteroaryl compound (e.g., deoxycytidine) and the first heteroaryl compound (e.g., thymidine). For instance, in some embodiments, the kit can include one or more packages that each contain one of the compounds (e.g., nucleosides) or both of the compounds (e.g., nucleosides). For instance, in some embodiments, a package can contain both the second heteroaryl compound (e.g., deoxycytidine) and the first heteroaryl compound (e.g., thymidine). In some embodiments, at least one package contains the second heteroaryl compound (e.g., deoxycytidine) but not the first heteroaryl compound (e.g., thymidine), or the first heteroaryl compound (e.g., thymidine) but not the second heteroaryl compound (e.g., deoxycytidine). Exemplary packages include foil packages, paper packages, and plastic bottles. In some embodiments, the packages can be configured to be torn to expose the compounds (e.g., nucleosides) contained therein, e.g. the foil package or paper package can have a perforation. In some cases the mass of compound (e.g., nucleoside) per package ranges from 0.1 g to 10 g, such as from 0.5 g to 4.0 g.

In some embodiments, the kits can include a container for dissolving the compounds (e.g., nucleosides) in the aqueous liquid. For instance, in some embodiments, the container can comprise a lid and a mark corresponding to a specific volume during the dissolving. For instance, in some embodiments, the mark can include a volumetric unit, e.g. milliliters, cups, fluid ounces, tablespoons, teaspoons, or drams. Stated in another manner, in some embodiments, the mark can correspond to specific volume. For instance, FIG. 2 shows an exemplary container having three markings labeled with a specific volume, i.e. 50 mL, 100 mL, and 150 mL. In some embodiments, the container can have three markings labeled with different specific volumes, including, but not limited to, 40 mL, 80 mL, and 120 mL. The markings on the container can correspond with any specific volume relevant to the preparation of the composition or product. In some embodiments, the mark can indicate how many packages of the second heteroaryl compound (e.g., deoxycytidine) and the first heteroaryl compound (e.g., thymidine) to use in the dissolving step. For instance, FIG. 1 shows an exemplary container having three marks, wherein each mark has a line indicating the height of the liquid, a symbol corresponding to a package, and a number associated with the number of packages. The FIG. 1 symbol represents a paper or foil package that has been torn near its top, e.g. along a perforation. For example, in some embodiments, a user can empty the desired number of packages of compounds (e.g., nucleosides) into the container and then add a volume of liquid to the indicated height mark. In some embodiments, the container comprises plastic, e.g. a transparent plastic.

In some embodiments, the kits can include syringes for use in orally administering the compound (e.g., nucleoside)

containing solution to a subject. In some embodiments, the syringe can be configured to contain between 1 mL and 150 mL of a liquid. In some embodiments, the kit includes a nasogastric tube or a gastrostomy tube. For instance, in some embodiments, the kit can include both the syringe and a tube, wherein the syringe is configured to mate with the tube for delivery of the solution to the subject.

In some embodiments, the kits can comprise printed instructions for using any of the items in the kits, e.g. for performing any of the methods described herein. In some embodiments, the instructions can include words, symbols, or a combination thereof printed on a paper, printed on a package, or printed on any other suitable surface. In some embodiments, the instructions can be provided in electronic format, e.g. on a non-transitory computer readable media. In some embodiments, the instructions can be provided as a reference to an internet address that describes using the items, e.g. the kit can comprise a Quick Response code (QR code) that can be interpreted by a computer system to provide an internet address.

In some embodiments, the instructions direct a user to dissolve the second heteroaryl compound (e.g., deoxycytidine) and the first heteroaryl compound (e.g., thymidine) in a specific volume of an aqueous liquid. For example, in some embodiments, the instructions can direct the user to dissolve 2 packages that each contain the second heteroaryl compound (e.g., deoxycytidine) and the first heteroaryl compound (e.g., thymidine) in a container and fill the container with water to a mark corresponding to 2 packages. In some embodiments, the user can be the patient, a medical professional, or a non-professional caregiver, e.g. a family member of the patient. In some embodiments, the instructions direct a user to mix the second heteroaryl compound (e.g., deoxycytidine) and/or the first heteroaryl compound (e.g., thymidine) in a specific volume of an aqueous liquid to form a mixture, and then to shake the mixture and/or invert the mixture to dissolve the second heteroaryl compound and/or the first heteroaryl compound. In some embodiments, the printed instructions further direct the user to dissolve the first heteroaryl compound and the second heteroaryl compound in a specific volume of an aqueous liquid by inverting and then righting the closed container one or more times.

In some embodiments, the instructions direct a user to dissolve a single dosage amount of the second heteroaryl compound (e.g., deoxycytidine) and a single dosage amount of the first heteroaryl compound (e.g., thymidine) in a specific volume of an aqueous liquid to form a solution, and then to administer the solution to a patient. In some embodiments, the instructions direct a user to dissolve a daily dosage amount of the second heteroaryl compound (e.g., deoxycytidine) and a daily dosage amount of the first heteroaryl compound (e.g., thymidine) in a specific volume of an aqueous liquid to form a solution, to divide the solution into multiple individual doses, and then to separately administer each of the individual doses to a patient throughout the day.

In some embodiments, the instructions direct the user to orally administer the solution to the subject. In some embodiments, the solution can be orally administered with or without a syringe directly into the mouth of the subject. In some embodiments, the solution can be orally administered with or without a syringe through a nasogastric tube or the gastrostomy tube to the subject. In some embodiments, the instructions can direct the user to administer the solution any suitable of number of times per day, such as 1 time a day, 2 times a day, 3 times a day, or 4 or more times a day. For instance, in some embodiments, each administration throughout the day can be of the same amount of nucleosides. In some embodiments, instructions state that the second heteroaryl compound (e.g., deoxycytidine) and the first heteroaryl compound (e.g., thymidine) are to be administered in doses that each independently range from 100 mg/kg/day to 500 mg/kg/day. In some embodiments, the instructions state that the second heteroaryl compound (e.g., deoxycytidine) and the first heteroaryl compound (e.g., thymidine) are to be administered in doses that each independently range from 1 g/day to 5 g/day. In some embodiments, the instructions state that the solution is for administration to a subject that has been diagnosed with a mitochondrial DNA depletion syndrome, a deficiency in thymidine, a deficiency in deoxycytidine, a mutation in the TK2 gene, or a combination thereof.

In some embodiments, the kit comprises a first heteroaryl compound and a second heteroaryl compound. In some embodiments, the first heteroaryl compound is thymidine and the second heteroaryl compound is deoxycytidine. In some embodiments, the first heteroaryl compound is Compound G

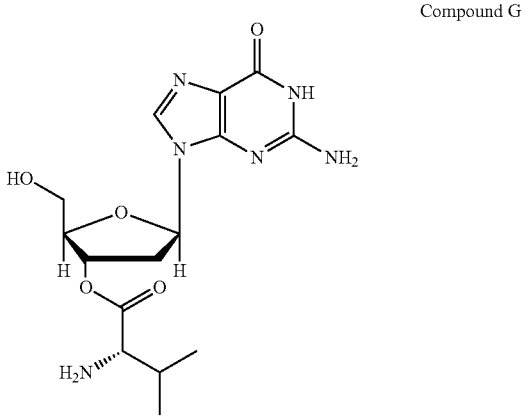 [SMILES: CC(C)[C@H](N)C(=O)O[C@@H]1C[C@H](n2cnc3c(=O)[nH]c(N)nc32)O[C@@H]1CO]

Compound G and the second heteroaryl compound is Compound A

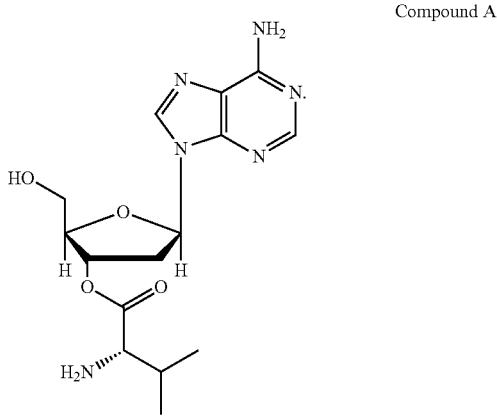 [SMILES: CC(C)[C@H](N)C(=O)O[C@@H]1C[C@H](n2cnc3c(N)ncnc32)O[C@@H]1CO]

Compound A

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); nt, nucleotide(s): and the like.

Example 1: Solubility of Thymidine in Aqueous Liquids

The solubility of thymidine was investigated wherein the dissolving liquid was water, pH 3 buffered water, and deoxycytidine containing water. The deoxycytidine employed in the solubility studies is referred to as Form A deoxycytidine, e.g. as described in U.S. Patent Publication 2021/0054014, which is incorporated herein by reference. Form A deoxycytidine is characterized by an X-ray diffraction pattern comprising peaks at 8.4, 12.9, 14.2, 16.8, 18.4, 19.4, 28.4, 30.0, and 30.6 degrees two-theta (2θ) (+/−0.2). The X-ray diffraction pattern can be recorded using CuK$_{\alpha 1}$ radiation.

The procedure involved adding 300 mg of the thymidine to 3.0 mL of liquid and stirring. The three liquids were water, water wherein 50 mg/mL of deoxycytidine had already been dissolved, and water buffered at about pH 3. The pH 3 buffered water was created by adding 821 mg of anhydrous citric acid and 213 mg of sodium citrate dehydrate to a 100 mL volumetric flask and adding water to the 100 mL mark while dissolving the solids. The deoxycytidine solution was created by adding 500 mg of deoxycytidine to a 10 mL volumetric flask and filling the flask with water while dissolving the solids, yielding a pH of 8.23 and a deoxycytidine concentration of about 50 mg/mL.

The liquids were stirred and samples were withdrawn at 5 mins, 10 mins, and 24 hours. At each time period 0.7 mL of the suspension was removed and subjected to filtration through a 0.45 μm PTFE filter, and 0.3 mL of the suspension was removed and centrifuged at 10,000 rpm for 2 minutes. The filtrate from the filtration and the supernatant from the centrifugation were subjected to high performance liquid chromatography (HPLC) to determine the amount of dissolved thymidine.

The results of the solubility studies are shown in Table 1 below. Solubilities are reported in mg/mL.

TABLE 1

Dissolved thymidine (in mg/mL) after stirring for specified time periods

|  | 5 mins | 10 mins | 24 hrs |
|---|---|---|---|
| Water | 51.94 | 54.55 | 51.04 |
| pH 3 buffered water | 58.10 | 59.66 | 52.04 |
| Water with 50 mg/mL of deoxycytidine | 71.78 | 87.40 | 65.62 |

The pH of the suspensions were also recorded. See Table 2 below.

TABLE 2 pH of suspensions after stirring for specified time periods

|  | 5 mins | 10 mins | 24 hrs |
|---|---|---|---|
| Water | 7.3 | 7.3 | 7.3 |
| pH 3 buffered water | 3.2 | 3.1 | 3.1 |
| Water with 50 mg/mL of deoxycytidine | 7.3 | 7.1 | 7.3 |

After 5 minutes, about 52 mg/mL of thymidine was dissolved in water whereas about 58 mg/mL was dissolved in the pH 3 buffered water. Notably, the 50 mg/mL deoxycytidine solution provided a thymidine solubility of about 72 mg/mL, which is about 38% higher than the thymidine solubility in water (i.e. 52 mg/mL).

In addition, at 10 minutes of stirring the solubility of thymidine further increased to about 87 mg/mL for the deoxycytidine liquid. At the 10 minute time period the thymidine solubility in water and pH 3 buffer increased to about 55 and 60 mg/mL, respectively. As such, at 10 minutes the thymidine solubility in the deoxycytidine liquid was about 58% higher than in water (i.e. 87 mg/mL compared to 55 mg/mL).

These experiments demonstrate that deoxycytidine can significantly increase the solubility of thymidine in aqueous liquids. Stated in another manner, the presence of deoxycytidine increased the solubility of the thymidine in the liquid.

Example 2: Reconstitution of Thymidine in Aqueous Liquids

The solubility of thymidine in combination with different amounts of deoxycytidine was determined using HPLC and reconstitution methods as described below.

Standard Solution

A 0.1 mg/mL standard solution of deoxycytidine (dC) and thymidine (dT) was prepared by adding 5 mg of each of deoxycytidine and thymidine to a 50 mL volumetric flask and diluted with approximately 40 mL of diluent (e.g., water) to form a mixture. The mixture was shaken for 10 minutes at 125 rpm on a laboratory shaker. 10 mL of diluent (e.g., water) was then added and the mixture was mixed. The standard solution was prepared in duplicate.

Sample Preparation

Stock Solution

Each 50 mg/mL stock solution was prepared by adding 120 mL of purified water to a 400 mL beaker, stirring the water at 650 rpm, and then adding the amounts of thymidine and/or deoxycytidine as listed in the Table 3 below for each sample to form mixtures.

TABLE 3

| Test Series | Samples | | |
|---|---|---|---|
|  | Sample | Amount dT (mg) | Amount dC (mg) |
| 1 (Reference) | 1 | 6000 | 6000 |
|  | 2 | 6000 | 6000 |
| 2 (dT Single) | 1 | 6000 | 0 |
|  | 2 | 6000 | 0 |
| 3 (Linearity dC Amount) | 10% | 6000 | 600 |
|  | 20% | 6000 | 1200 |
|  | 40% | 6000 | 2400 |
|  | 80% | 6000 | 4800 |

Each mixture was stirred at 650 rpm for about 1 minute, after which the stirring was reduced to 150 rpm and maintained at 150 rpm for about 1 minute. After about 2 minutes total, the mixture was filtered through a 0.45 µm syringe filter to obtain filtered stock solutions for each sample.

Intermediate Solution 0.9 mg/mL intermediate solutions of each of the above samples were prepared by adding 1.0 mL of the respective filtered stock solution into a 50 mL volumetric flask and diluting to volume with a diluent (e.g., water) and mixing.

Working Solution 0.09 mg/mL working solutions of each of the above samples were prepared by adding 1.0 mL of the respective intermediate solution into a 10 mL volumetric flask and diluting to volume with a diluent (e.g., water) and mixing. The resulting mixture was transferred to an HPLC vial.

HPLC Methods

HPLC System Parameters

Working solutions for each of the above samples were subjected to HPLC analysis utilizing the conditions and parameters below and in Table 4. The data collected from the HPLC analysis was then used to calculate percent content of thymidine dissolved for each sample after 2 minutes of mixing.

Mobile Phase A: Purified Water (degassed by sonication)

Mobile Phase A: Acetonitrile (degassed by sonication)

TABLE 4

| Column | Inertsil ODS 3; 5 µm, 4.6 × 150 mm |
|---|---|
| Column Oven Temp. | 30° C. |
| Sampler | Temp. 5° C. |
| Flow Rate | 1.2 mL/min |
| Detection Wavelength | 250 nm (4), Ref off |
| Injection Volume | 5 µL |
| Run Time | 12 min |

| Gradient | Time (min.) | Mobile Phase A (%) | Mobile Phase B (%) |
|---|---|---|---|
| | 0 | 99 | 1 |
| | 8 | 80 | 20 |
| | 8.1 | 99 | 1 |
| | 12 | 99 | 1 |

Calculations

Content $$\text{Content [\%]} = \frac{A_{Sample} * W_{Std} * Purity_{Std} * V_{Sample}}{A_{Std} * W_{Sample} * V_{Std} * LCFW} * 100\%$$

$A_{Sample}$=Peak area of dC or dT in the sample solution $W_{Std}$=Weight of dC or dT reference material [mg]

$Purity_{Std}$=Purity of dC or dT reference material in %/100

$V_{Sample}$=Dilution of sample solution corrected with dC or dT [mL]

LCFW=Correction factor of Label Claim and fill weight/ 0.4825 (2000 mg/4145 mg)

$A_{Std}$=Mean peak area of dC or dT in the 6 injections of Std1 at beginning $W_{Sample}$=Weight of sample (mg)

$V_{Std}$=Dilution of standard solution [mL]/50 mL

100=Conversion in %

Results

The results obtained from the procedures above are shown in Table 5 below and in FIG. 3. The dC Level is the percentage of the mass of dC relative to dT. The dT Content is the percentage of dT in solution within 2 minutes of stirring in the presence of the indicated dC level.

TABLE 5

| dC Level [%] | 0 | 10 | 20 | 40 | 80 | 100 |
|---|---|---|---|---|---|---|
| dT Content [%] | 89.09 | 93.39 | 92.69 | 95.68 | 96.78 | 95.91 |

Figure 3:
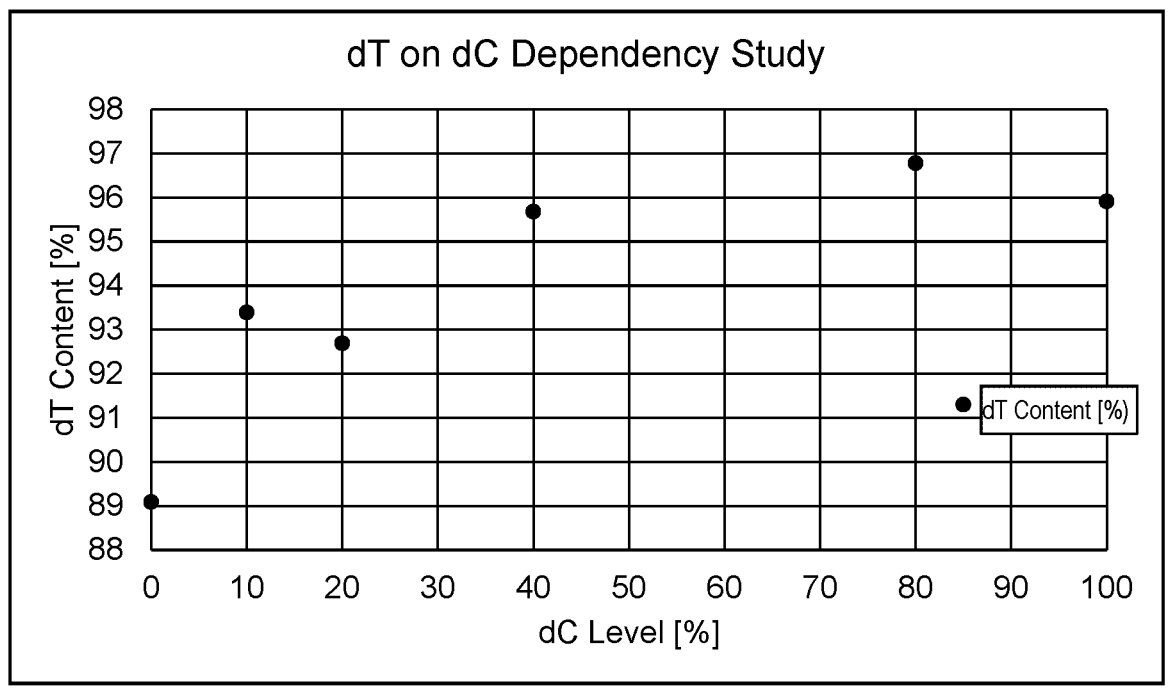
FIG. 3 shows results from a reconstitution study for thymidine in aqueous liquids containing differing amounts of deoxycytidine as a percent of the dT mass content.

Table 5 and FIG. 3 show that the amount of thymidine that dissolves after 2 minutes of mixing increases as the concentration of deoxycytidine increases, and that the amount of dissolved thymidine reaches its highest value with at least 40% deoxycytidine.

Example 3: Preparation of Compound G

Step 1: Starting with deoxyguanosine, the 5'-hydroxy group of deoxyguanosine was selectively protected by addition of a TBDPS (t-butyldiphenylsilyl) group under reaction conditions of t-butyldiphenylsilyl chloride (TBDPSCl)/dimethylaminopyridine (DMAP) in dimethylformamide (DMF) at room temperature (rt).

Step 2: The esterification of the 3'-hydroxy group was accomplished with (carbobenzoxy) Boc-L-Valine and dicyclohexylcarbodiimide (DCC) in $CH_2Cl_2$ (DCM) to give the protected intermediate, which was purified by silica column chromatography for a total yield of 49%.

Step 3: The TBDPS group was then removed using n-$Bu_4$NF (TBAF) in tetrahydrofuran (THF) at rt to give the free hydroxy compound in 75% yield after column purification.

Step 4: Hydrogenation using hydrogen gas in solution with carbon on palladium catalyst in the presence of L-tartaric acid gave Compound G as the L-tartaric salt.

Example 4: Preparation of Compound A

Step 1: Starting with deoxyadenosine, the 5'-hydroxy group was selectively protected by a 4,4'-dimethoxytrityl (DMTr) group in pyridine at 0-10° C. to give the protected compound with a yield of 60% after column purification.

Step 2: The esterification of the 3'-hydroxy group was accomplished as in Ex. 3 by Boc-L-Valine and DCC in DCM at rt to give the protected intermediate, which was purified by silica column chromatography to provide a total yield of 84%.

Step 3: The removal of the DMTr group was realized with aq. 80% AcOH at rt. The product was purified by silica column chromatograph in 74% yield.

Step 4: The condition of $H_3PO_4$/DCM was employed for the de-Boc protection, then charging of L-tartaric acid was used to give Compound A as the L-tartrate salt in 76% yield by crystallization.

Example 5: Solubility Tests

The solubility of Compound G in combination with multiple concentrations of Compound A was determined.

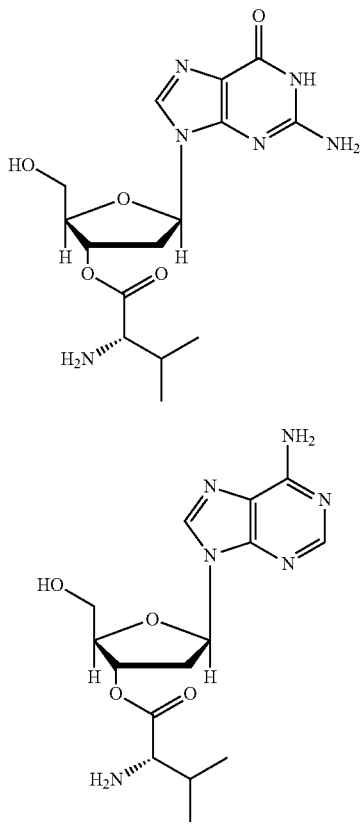

Compound G

Compound A

Compound G and Compound A were added to phosphate buffered saline (PBS) at a pH of 7.4 at room temperature in the ratios and concentrations listed below in Table 6 to form 15 different samples. The solubility of each sample was observed for each sample.

| Sample | Molar Ratio (G:A) | Compound G Concentration | Compound A Concentration | Observed Solubility |
|---|---|---|---|---|
| 1 | 1:0 | 122.69 mM (63.37 mg/mL) | 0 | Mostly dissolved |
| 2 | 1:0.1 | 122.69 mM (63.37 mg/mL) | 12.269 mM (6.14 mg/mL) | Mostly dissolved |
| 3 | 1:0.25 | 122.69 mM (63.37 mg/mL) | 30.67 mM (15.35 mg/mL) | Mostly dissolved |
| 4 | 1:0.5 | 122.69 mM (63.37 mg/mL) | 61.34 mM (30.7 mg/mL) | Clear |
| 5 | 1:1 | 122.69 mM (63.37 mg/mL) | 122.69 mM (61.4 mg/mL) | Clear |
| 6 | 1:0 | 140.18 mM (72.4 mg/mL) | 0 | Cloudy |
| 7 | 1:0.1 | 140.18 mM (72.4 mg/mL) | 14.01 mM (7.01 mg/mL) | Cloudy |
| 8 | 1:0.25 | 140.18 mM (72.4 mg/mL) | 35.045 mM (17.54 mg/mL) | Cloudy |
| 9 | 1:0.5 | 140.18 mM (72.4 mg/mL) | 70.09 mM (35.08 mg/mL) | Clear |
| 10 | 1:1 | 140.18 mM (72.4 mg/mL) | 140.2 mM (70.16 mg/mL) | Clear |
| 11 | 1:0 | 175.23 mM (90.5 mg/mL) | 0 | Cloudy |
| 12 | 1:0.1 | 175.23 mM (90.5 mg/mL) | 17.5 mM (8.77 mg/mL) | Cloudy |
| 13 | 1:0.25 | 175.23 mM (90.5 mg/mL) | 43.81 mM (21.92 mg/mL) | Cloudy |
| 14 | 1:0.5 | 175.23 mM (90.5 mg/mL) | 87.62 mM (43.85 mg/mL) | Clear |
| 15 | 1:1 | 175.23 mM (90.5 mg/mL) | 175.23 mM (87.7 mg/mL) | Clear |

As shown in Table 6, the samples were cloudy for molar ratios of 1:0, 1:0.1, and 1:0.25. However, the samples turned clear for molar ratios of 1:0.5 and 1:1. The term "mostly dissolved" indicates minor amounts of precipitate.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A composition comprising a first heteroaryl compound and a second heteroaryl compound dissolved in an aqueous liquid, wherein the solubility of the first heteroaryl compound in the aqueous liquid is higher by 10 mg/mL or more compared with an otherwise identical aqueous liquid that lacks the second heteroaryl compound, and wherein the first heteroaryl compound is Compound G

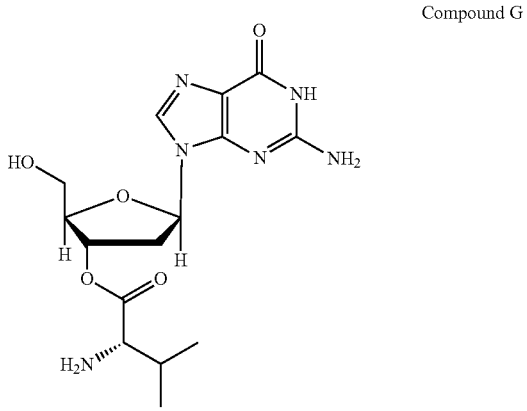 [SMILES: CC(C)[C@H](N)C(=O)O[C@@H]1C[C@H](n2cnc3c(=O)[nH]c(N)nc32)O[C@@H]1CO]

Compound G and the second heteroaryl compound is Compound A,

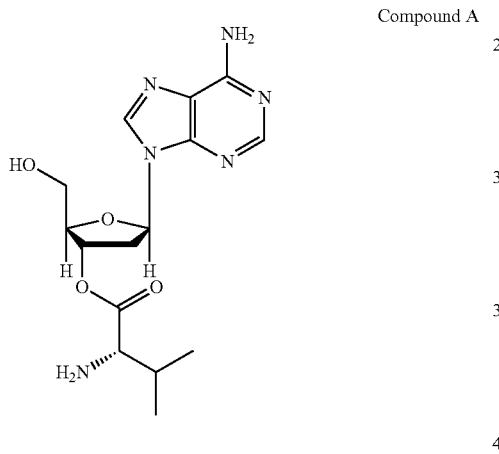

Compound A or the first heteroaryl compound is deoxythymidine and the second heteroaryl compound is deoxycytidine;
wherein if the first heteroaryl compound is Compound G and the second heteroaryl compound is Compound A, then a concentration of Compound A is about 30 mg/mL or more and a concentration of Compound G is about 60 mg/mL or more; and
wherein if the first heteroaryl compound is deoxythymidine and the second heteroaryl compound is deoxycytidine, then a concentration of deoxycytidine is about 50 mg/mL or more, and a concentration of deoxythymidine is about 60 mg/mL or more.

2. The composition of claim 1, wherein the first heteroaryl compound is deoxythymidine and the second heteroaryl compound is deoxycytidine.

3. The composition of claim 2, wherein the deoxythymidine is at a concentration of about 70 mg/mL to about 100 mg/mL; and wherein the deoxycytidine is at a concentration of about 60 mg/mL to about 100 mg/mL.

4. The composition of claim 3, wherein the mass of deoxythymidine ranges from 0.5 g to 6.0 g per dose unit; and wherein the mass of deoxycytidine ranges from 0.5 g to 6.0 g per dose unit.

5. The composition of claim 1, wherein the combined mass of deoxythymidine and deoxycytidine ranges from 1.0 g to 12.0 g per dose unit.

6. The composition of claim 1, wherein the first heteroaryl compound is Compound G

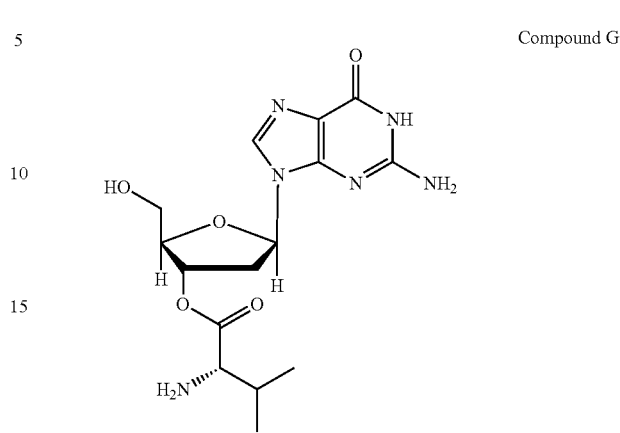

Compound G and the second heteroaryl compound is Compound A

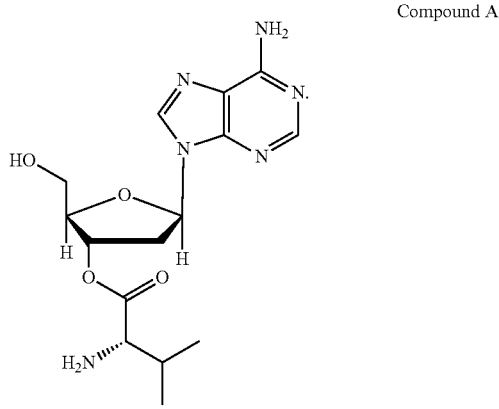 [SMILES: CC(C)[C@H](N)C(=O)O[C@@H]1C[C@H](n2cnc3c(N)ncnc32)O[C@@H]1CO]

Compound A

7. The composition of claim 6, wherein Compound G is at a concentration of about 70 mg/mL or more.

8. The composition of claim 6, wherein Compound A is at a concentration ranging from about 40 mg/mL to about 100 mg/mL.

9. The composition of claim 6, wherein the molar ratio of Compound G to Compound A is from about 1:0.1 to about 1:1.

10. The composition of claim 6, wherein the mass of Compound G ranges from 0.5 g to 6.0 g per dose unit, and wherein the mass of Compound A ranges from 0.5 g to 5.0 g per dose unit.

11. The composition of claim 6, wherein the combined mass of Compound G and Compound A ranges from 1.0 g to 12.0 g per dose unit.

12. The composition of claim 1, wherein if the first heteroaryl compound is deoxythymidine and the second heteroaryl compound is deoxycytidine, then the deoxycytidine is at a concentration of 70 mg/ml or more, and the deoxythymidine is at a concentration of about 70 mg/mL or more.

13. The composition of claim 1, wherein if the first heteroaryl compound is deoxythymidine and the second heteroaryl compound is deoxycytidine, then the deoxycytidine is at a concentration of 90 mg/ml or more, and the deoxythymidine is at a concentration of about 90 mg/mL or more.

14. The composition of claim 1, wherein if the first heteroaryl compound is Compound G and the second heteroaryl compound is Compound A; then the Compound A is at a concentration of 70 mg/ml or more, and the Compound G is at a concentration of about 70 mg/mL or more.

15. The composition of claim 1, wherein if the first heteroaryl compound is Compound G and the second heteroaryl compound is Compound A; then the Compound A is at a concentration of 90 mg/ml or more, and the Compound G is at a concentration of about 90 mg/mL or more.

16. The composition of claim 1, wherein the volume of aqueous liquid is from 1 mL to 150 mL.

17. A method comprising dissolving a first heteroaryl compound and a second heteroaryl compound in an aqueous liquid to form a composition, wherein the solubility of the first heteroaryl compound in the aqueous liquid is higher by 10 mg/mL or more compared to an otherwise identical composition comprising the first heteroaryl compound dissolved in an aqueous liquid without the second heteroaryl compound, and i. wherein the first heteroaryl compound is Compound G

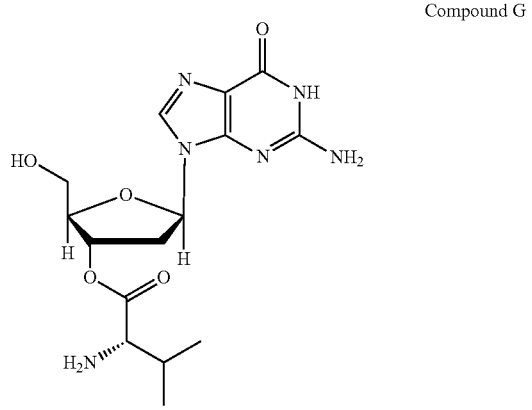 [SMILES: CC(C)[C@H](N)C(=O)O[C@@H]1C[C@H](n2cnc3c(=O)[nH]c(N)nc32)O[C@@H]1CO]

Compound G and the second heteroaryl compound is Compound A,

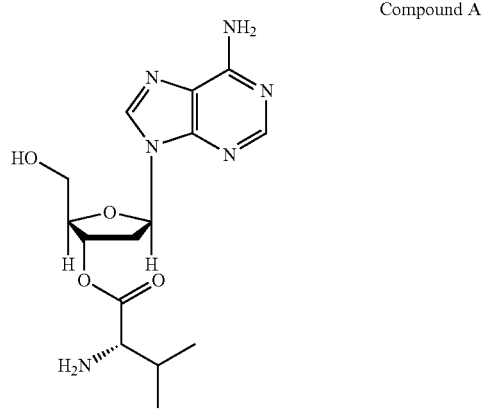

Compound A or the first heteroaryl compound is deoxythymidine and the second heteroaryl compound is deoxycytidine;

wherein if the first heteroaryl compound is Compound G and the second heteroaryl compound is Compound A, then a concentration of Compound A in the composition is about 30 mg/mL or more and a concentration of Compound G in the composition is about 60 mg/mL or more; and wherein if the first heteroaryl compound is deoxythymidine and the second heteroaryl compound is deoxycytidine, then a concentration of deoxycytidine in the composition is about 50 mg/mL or more, and a concentration of deoxythymidine in the composition is about 60 mg/mL or more;

ii. wherein the dissolving is performed for about 5 minutes or less and at least 95% of the first heteroaryl compound and at least 95% of the second heteroaryl compound are dissolved.

18. The method of claim 17, wherein the first heteroaryl compound is deoxythymidine and the second heteroaryl compound is deoxycytidine.

19. The method of claim 18, wherein the deoxythymidine is present at a concentration ranging from about 60 mg/mL to about 90 mg/mL.

20. The method of claim 18, wherein the mass of deoxythymidine ranges from about 0.5 g to about 6.0 g per dose unit, and wherein the mass of deoxycytidine ranges from 0.5 g to 6.0 g per dose unit.

21. The method of claim 18, wherein the deoxycytidine is present at a concentration ranging from about 50 mg/mL to about 90 mg/mL.

22. The method of claim 17, wherein the combined mass of deoxythymidine and deoxycytidine ranges from 1.0 g to 12.0 g per dose unit.

23. The method of claim 17, wherein the first heteroaryl compound is Compound G

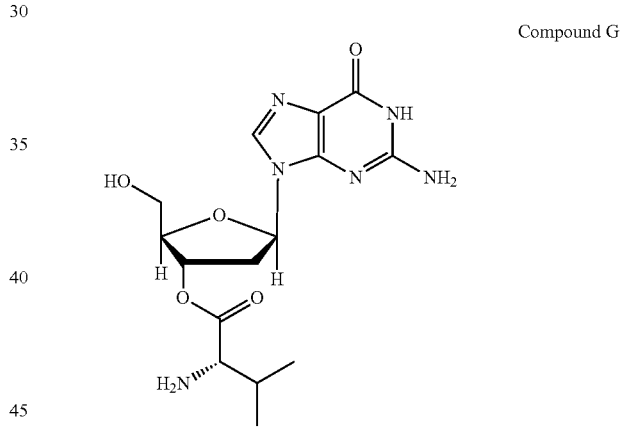

Compound G and the second heteroaryl compound is Compound A

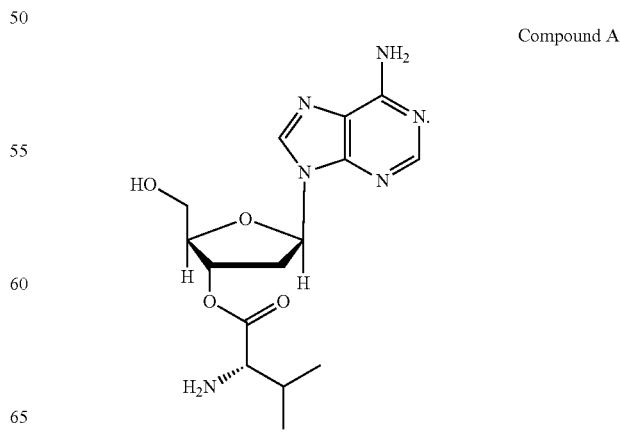

Compound A

24. The method of claim 23, wherein Compound G is present at a concentration ranging from about 60 mg/mL to about 100 mg/mL.

25. The method of claim 23, wherein Compound A is present at a concentration ranging from about 30 mg/mL to about 100 mg/mL.

26. The method of claim 23, wherein the mass of Compound G ranges from about 0.5 g to about 6.0 g per dose unit, and wherein the mass of Compound A ranges from 0.5 g to 6.0 g per dose unit.

27. The method of claim 23, wherein the combined mass of Compound G and Compound A ranges from 1.0 g to 12.0 g per dose unit.

28. The method of claim 23, wherein the molar ratio of Compound G to Compound A is from about 1:0.1 to about 1:1.

29. The method of claim 17, wherein the aqueous liquid is located inside a container comprising a mark corresponding to a specific volume of aqueous liquid recommended for dissolving the composition, wherein the mark corresponds to the specific volume of 40 mL, 50 mL, 80 mL, 100 mL, 120 mL, or 150 mL.

30. The method of claim 17, further comprising orally administering the solution to a subject, wherein the subject has a mitochondrial DNA depletion syndrome, a deficiency in deoxythymidine, a deficiency in deoxycytidine, a deficiency in deoxyguanosine, a deficiency in deoxyadenosine, a mutation in the TK2 gene, or a combination thereof.

31. A kit, comprising:
a composition comprising a first heteroaryl compound and a second heteroaryl compound, wherein the solubility of the first heteroaryl compound in an aqueous liquid is higher by 10 mg/mL or more compared with an otherwise identical aqueous liquid that lacks the second heteroaryl compound;
wherein the first heteroaryl compound is Compound G and the second heteroaryl compound is Compound A,

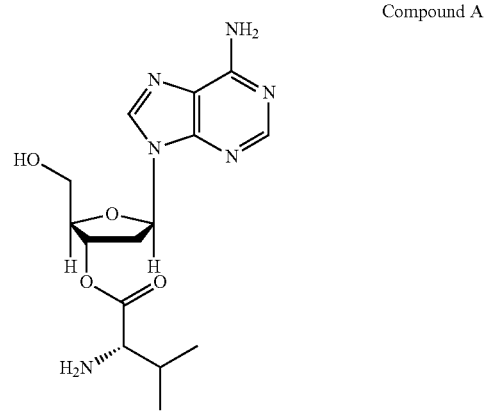

Compound A or the first heteroaryl compound is deoxythymidine and the second heteroaryl compound is deoxycytidine;
wherein the kit further comprises instructions, wherein the instructions direct the user to dissolve the second heteroaryl compound and the first heteroaryl compound in a specific volume of aqueous liquid;
wherein if the first heteroaryl compound is Compound G and the second heteroaryl compound is Compound A, then a specific volume is selected so that a concentration of Compound A is achieved of about 30 mg/mL or more and a concentration of Compound G is achieved of about 60 mg/mL or more;
wherein if the first heteroaryl compound is deoxythymidine and the second heteroaryl compound is deoxycytidine, then a specific volume is selected so that a concentration of deoxycytidine is achieved of about 50 mg/mL or more and a concentration of deoxythymidine achieved of about 60 mg/mL or more.

32. The kit of claim 31, further comprising a container with a lid and comprising at least one mark corresponding to a specific volume of aqueous liquid recommended for dissolving the composition, wherein the at least one mark corresponds to the specific volume of 40 mL, 50 mL, 80 mL, 100 mL, 120 mL, or 150 mL.

33. The kit of claim 31, wherein the first heteroaryl compound is deoxythymidine and the second heteroaryl compound is deoxycytidine.

34. The kit of claim 31, wherein the first heteroaryl compound is Compound G

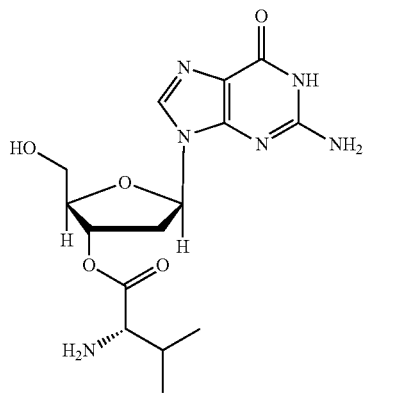

Compound G

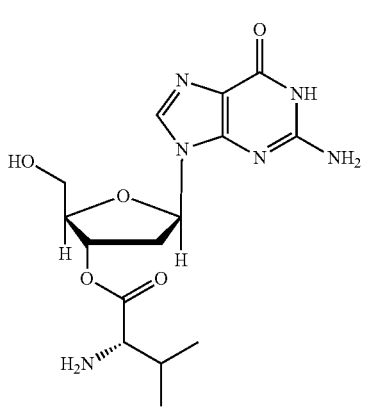

Compound G and the second heteroaryl compound is Compound A
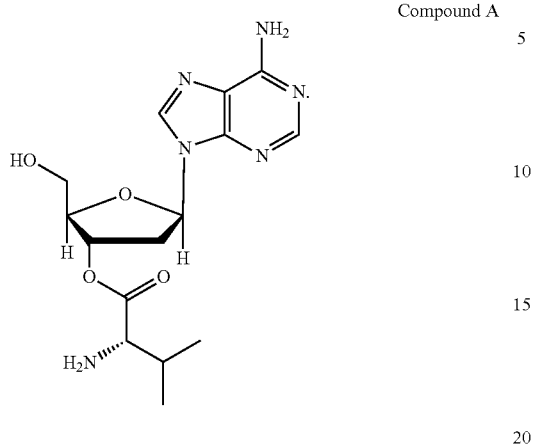
Compound A
* * * * *